(12) United States Patent
Saitoh

(10) Patent No.: US 8,913,260 B2
(45) Date of Patent: Dec. 16, 2014

(54) IMAGE PROCESSING DEVICE FOR READING AND TRANSMITTING AN IMAGE IN A NON-DISPLAY STATE

(71) Applicant: Fuji Xerox Co., Ltd., Tokyo (JP)

(72) Inventor: Tomoaki Saitoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/633,486

(22) Filed: Oct. 2, 2012

(65) Prior Publication Data

US 2013/0250327 A1   Sep. 26, 2013

(30) Foreign Application Priority Data

Mar. 23, 2012   (JP) ................. 2012-068176

(51) Int. Cl.
    *G06K 15/02*   (2006.01)
(52) U.S. Cl.
    USPC .......................... 358/1.13; 358/1.15; 358/468
(58) Field of Classification Search
    None
    See application file for complete search history.

(56) References Cited

U.S. PATENT DOCUMENTS

2005/0108353 A1 *   5/2005   Yamamoto ................ 709/208
2010/0053676 A1 *   3/2010   Sugimoto .................. 358/1.15
2010/0110500 A1 *   5/2010   Inoue ........................ 358/468

FOREIGN PATENT DOCUMENTS

| JP | A-2005-149320 | 6/2005 |
| JP | A-2010-182272 | 8/2010 |
| WO | WO 95/30958 A1 | 11/1995 |

OTHER PUBLICATIONS

Office Action issued in Australian Application No. 2012244088 dated Aug. 20, 2013.
Office Action dated Jun. 27, 2014 issues in Australian Patent Application No. 2012244088.

* cited by examiner

*Primary Examiner* — Steven Kau
*Assistant Examiner* — Andrew H Lam
(74) *Attorney, Agent, or Firm* — Oliff PLC

(57) ABSTRACT

An image processing device includes a display control unit that displays any one of plural processing screen data including screen data provided by a server device on a display unit and executes an instructed process according to a display screen data, a receiving unit that receives, on the screen data provided by the server device, displayed on the display unit, a read instruction of causing an image reading unit to read a document image and a transmission instruction for storing image data corresponding to the read document image in the server device, an instruction maintaining unit that maintains the transmission instruction received by the receiving unit, and a reading and transmission executing unit that executes reading of the document image based on the read instruction and executes the transmission instruction maintained in the instruction maintaining unit with respect to the image data obtained by the reading after the reading is completed.

8 Claims, 21 Drawing Sheets

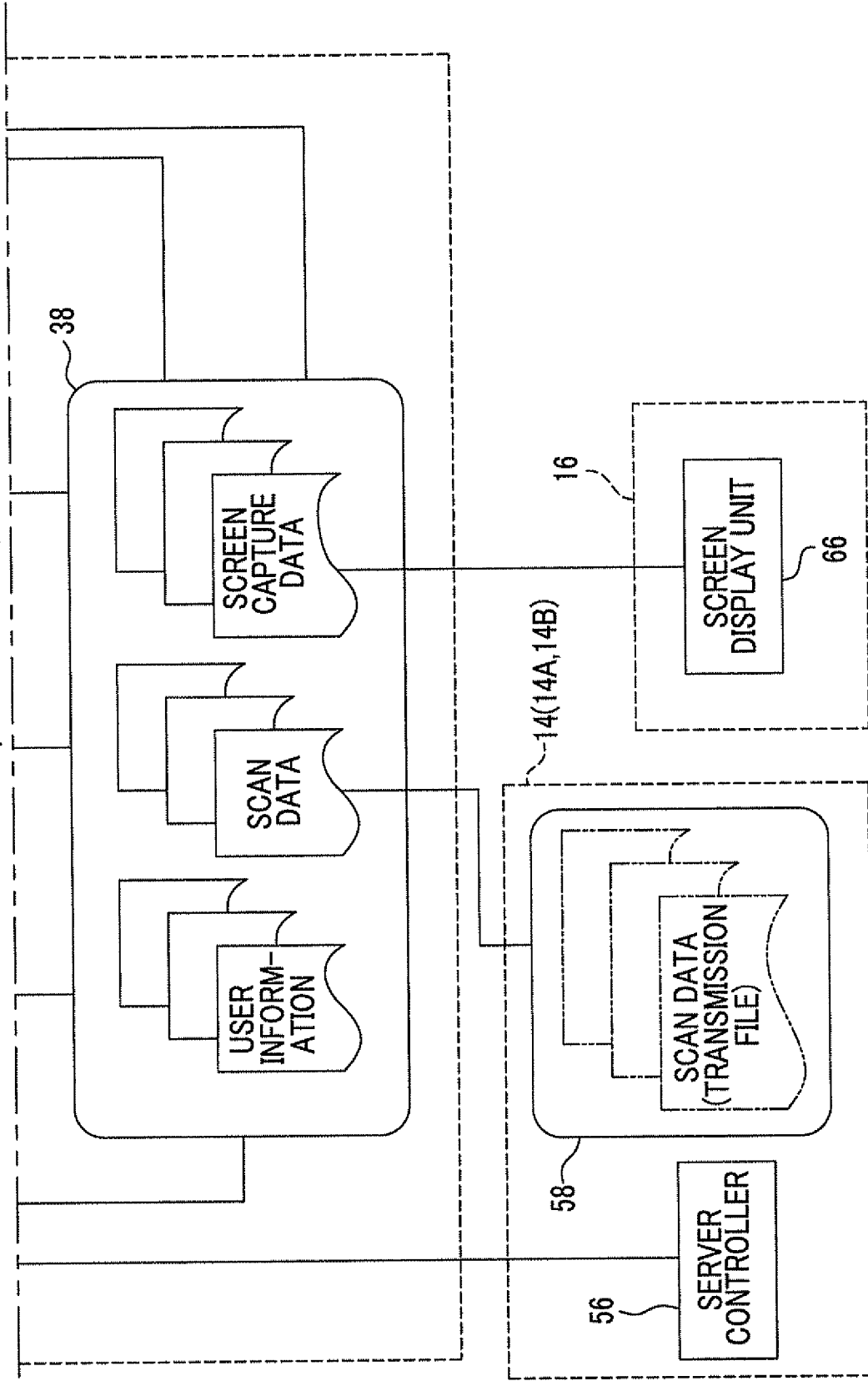

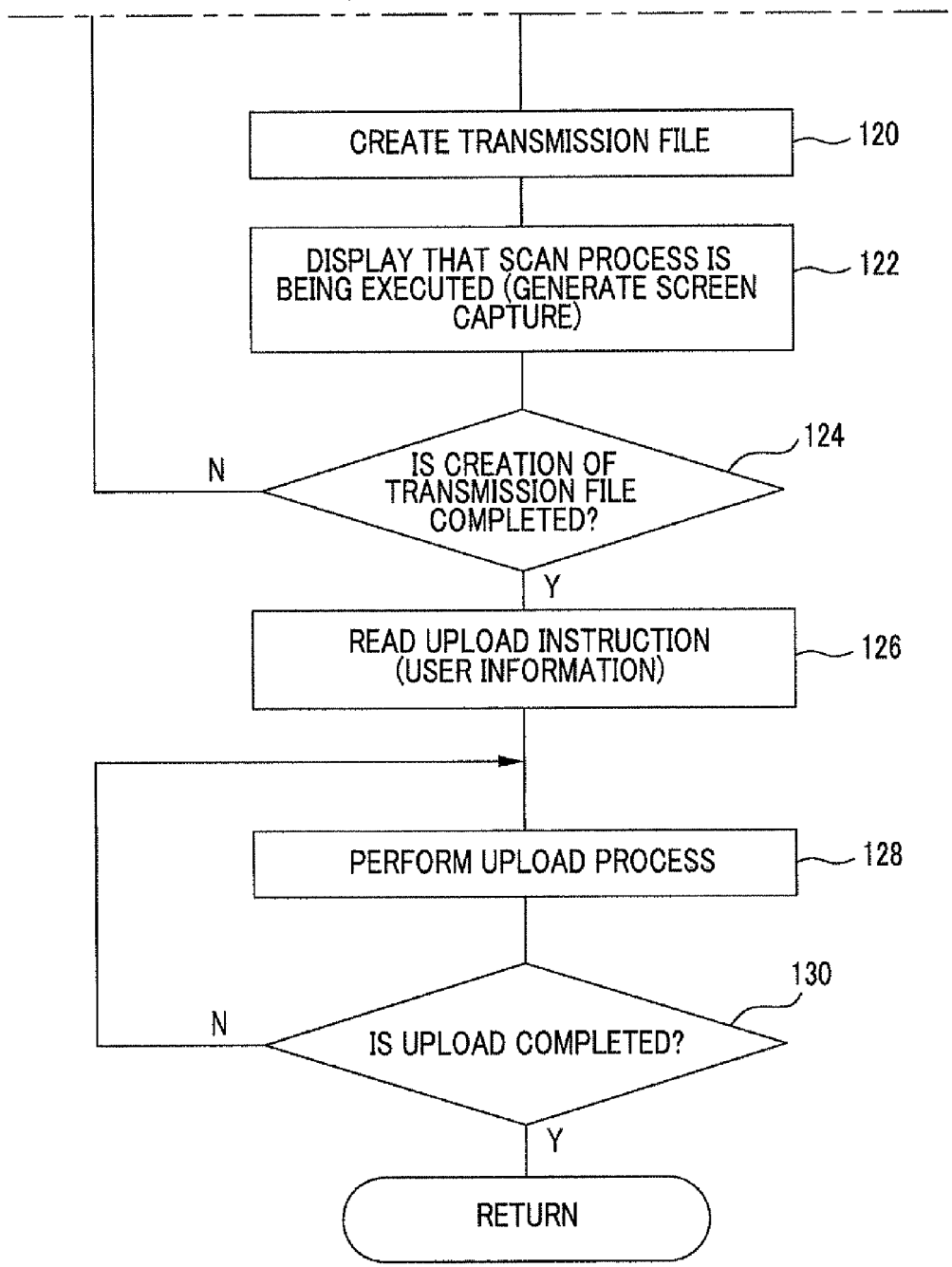

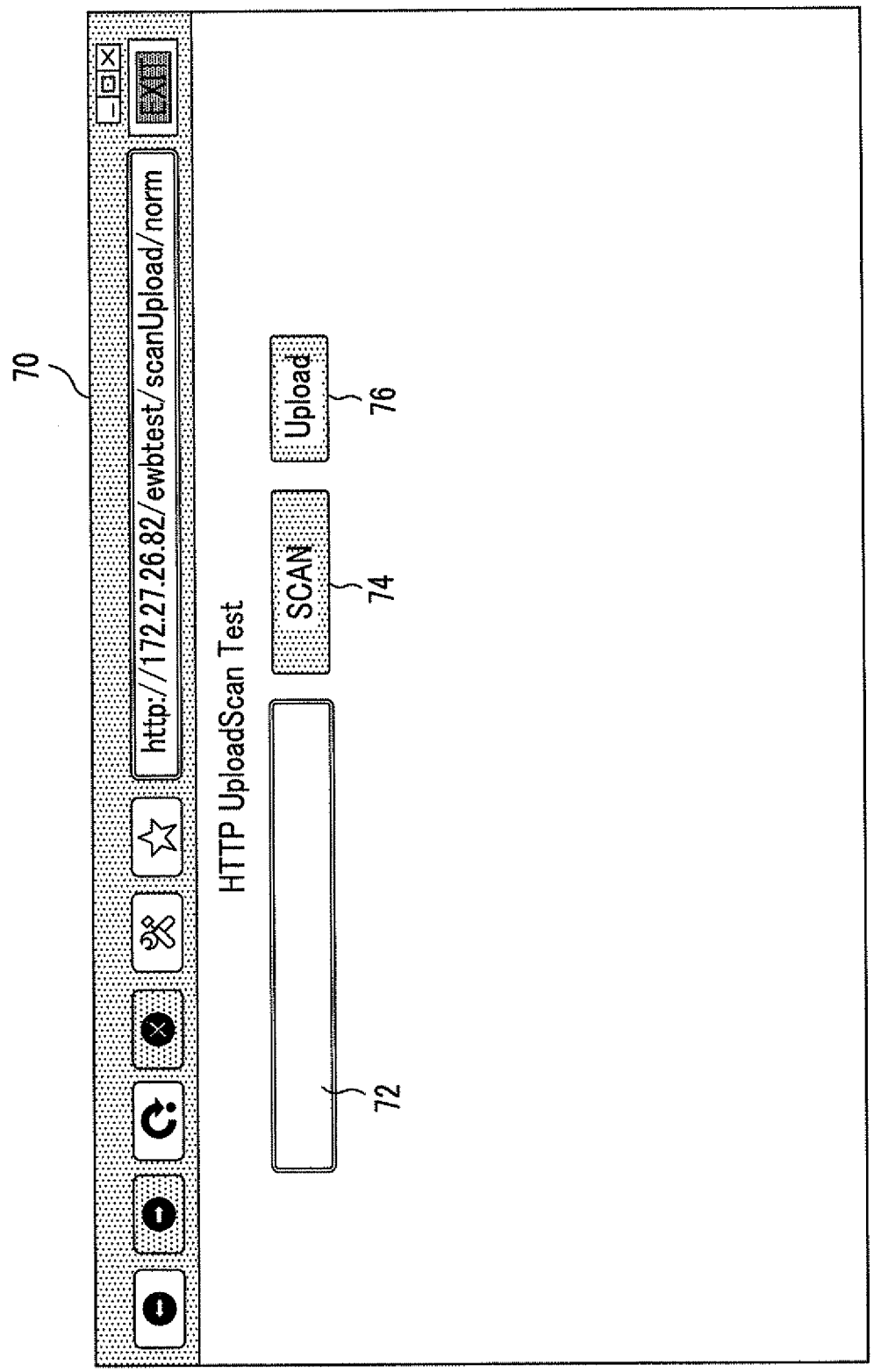

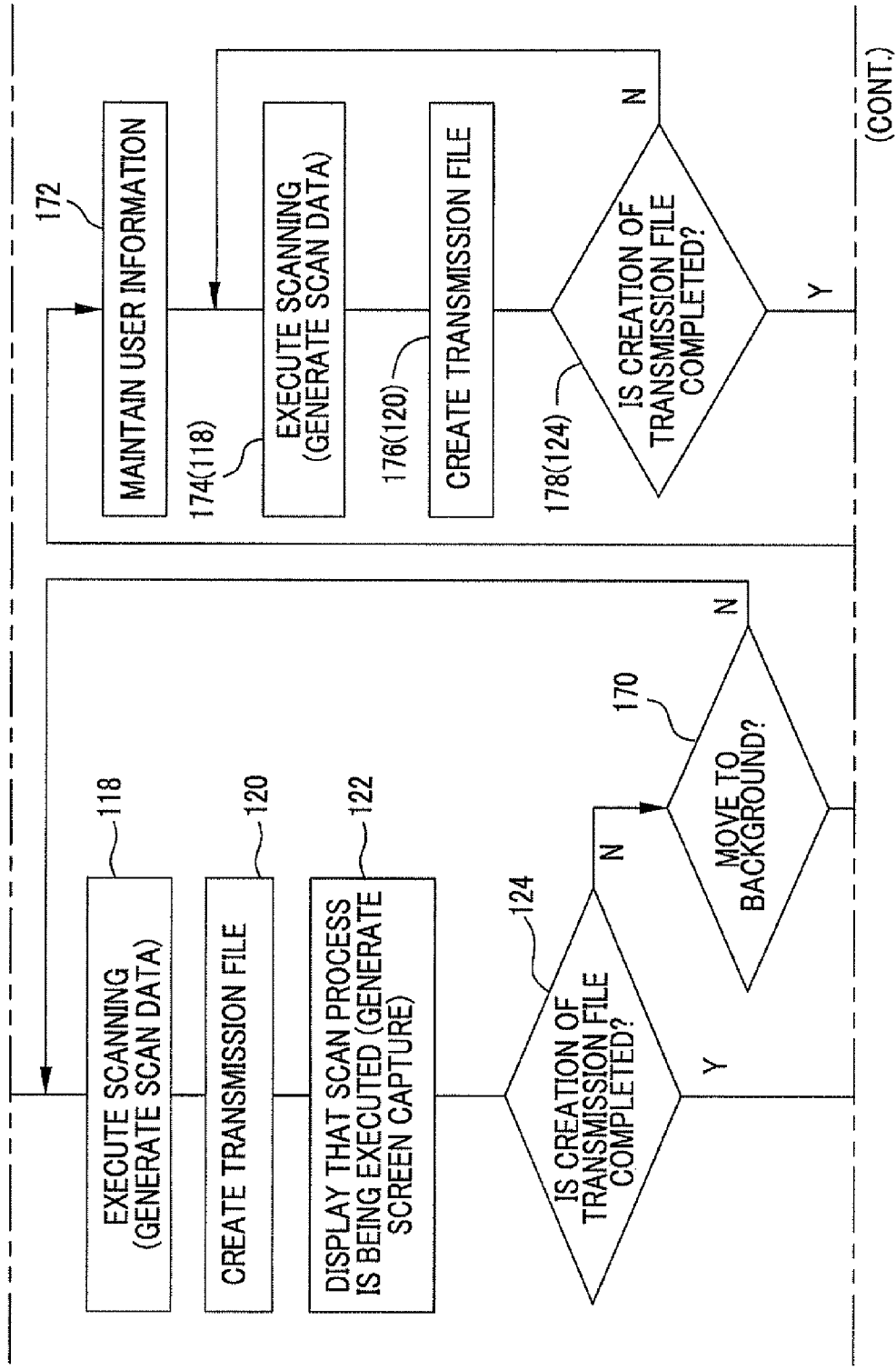

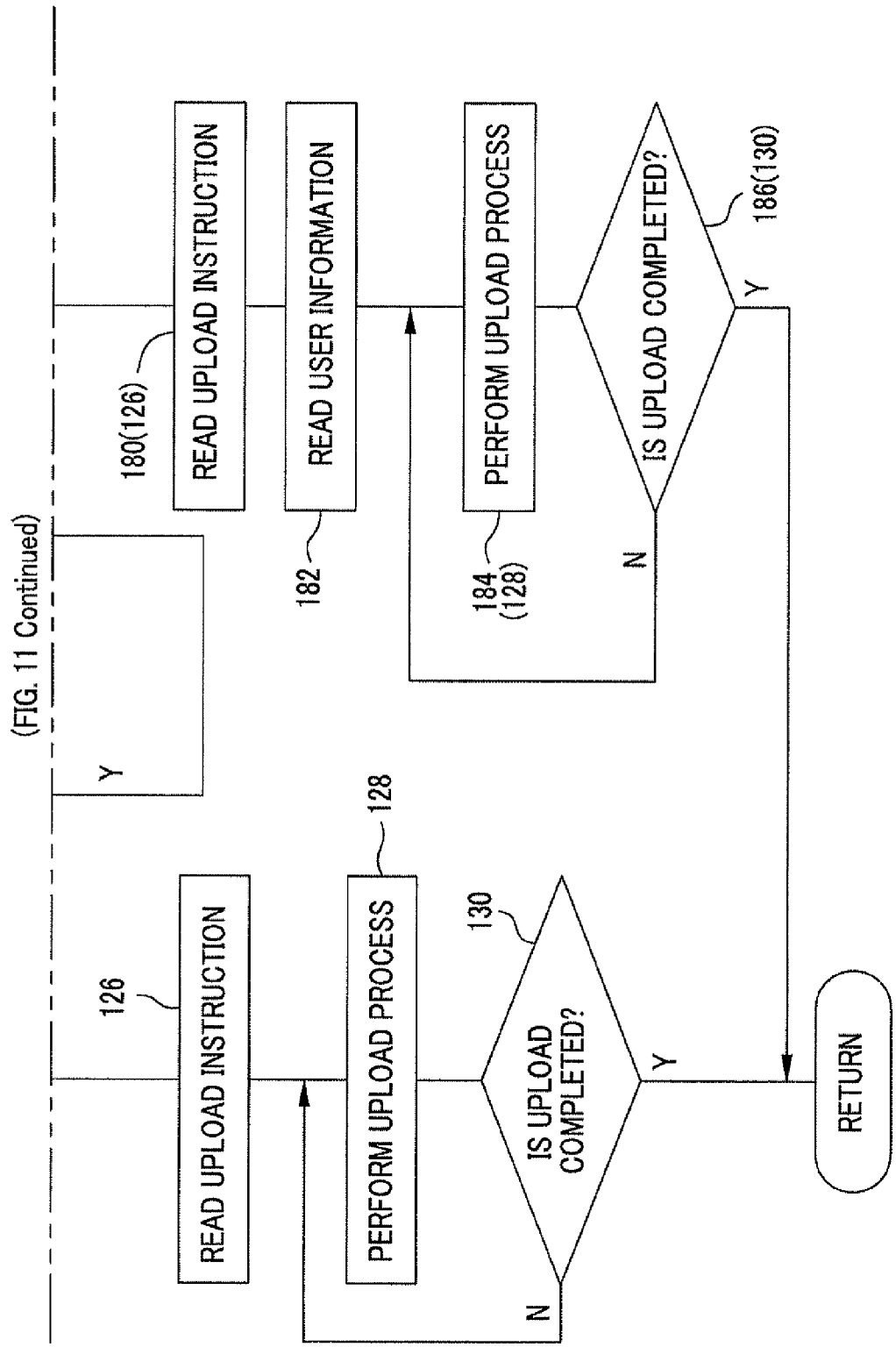

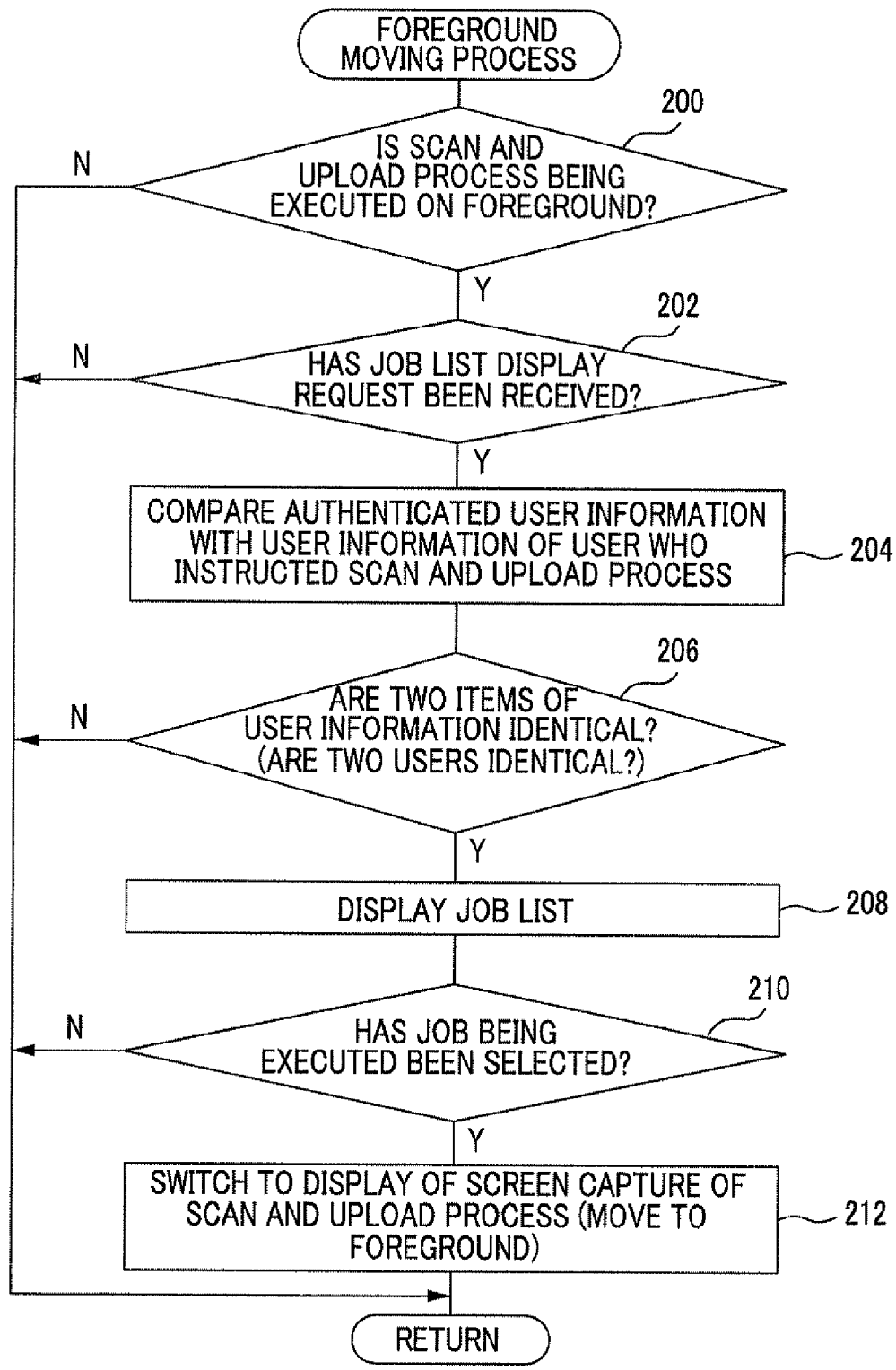

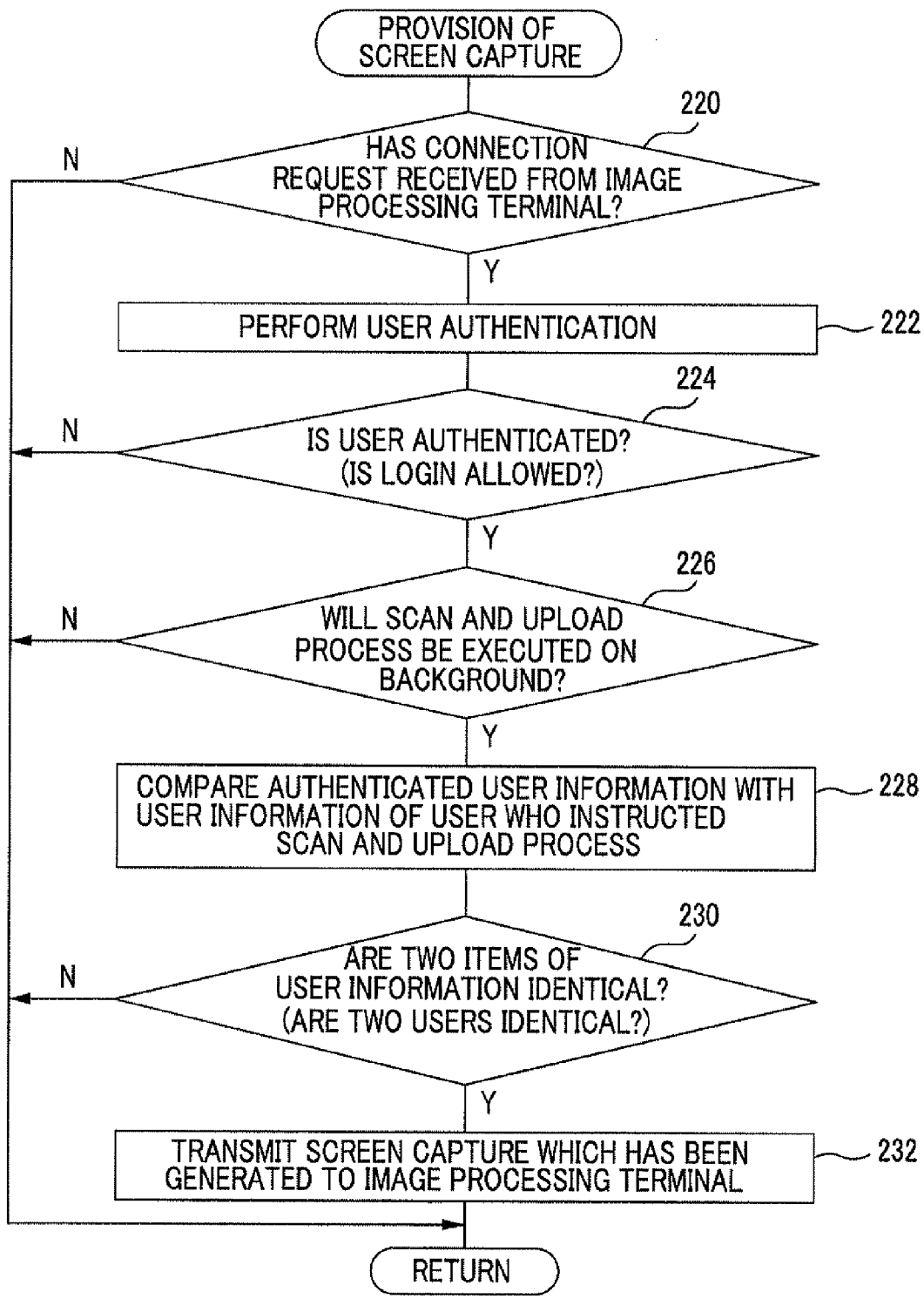

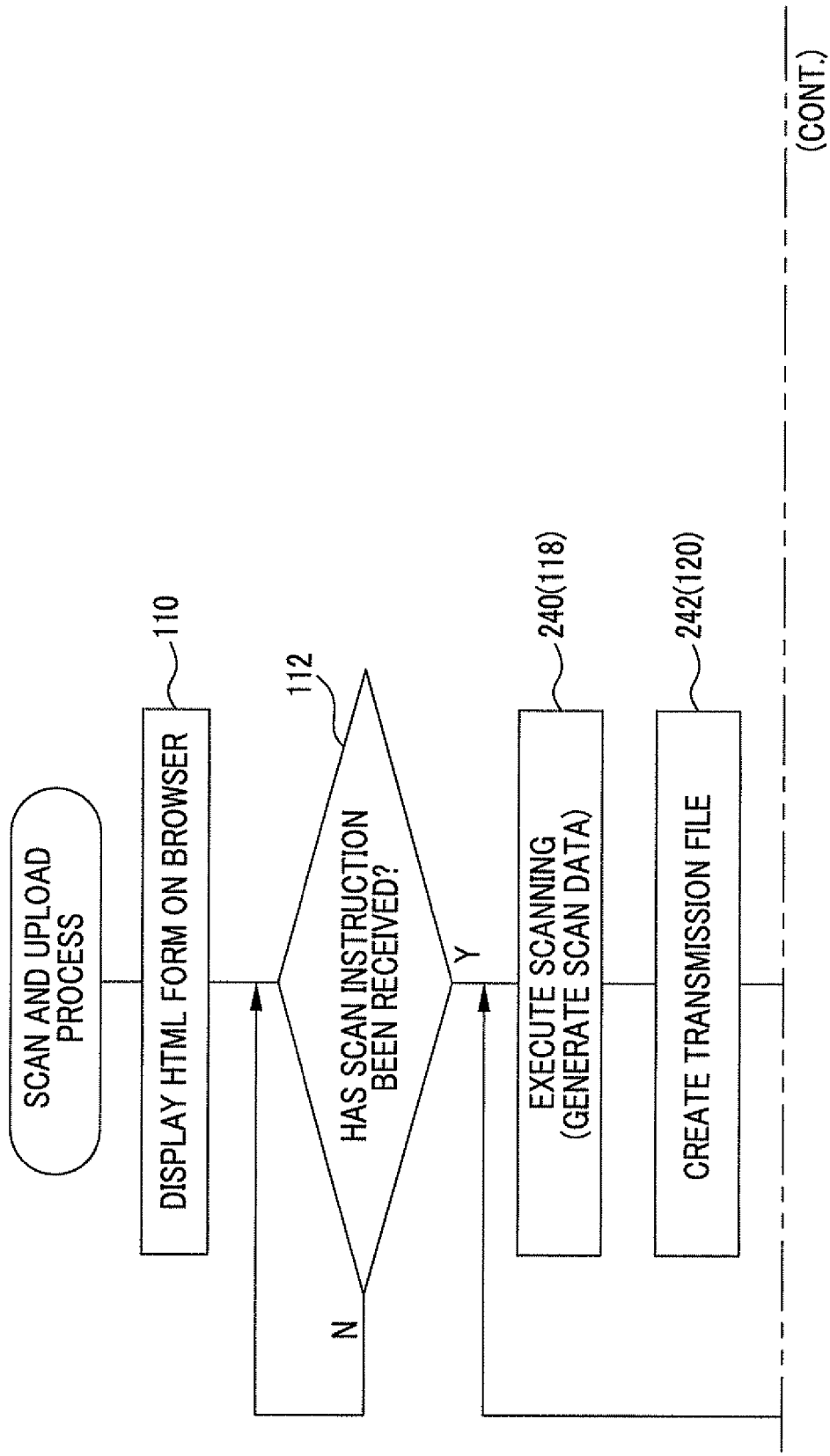

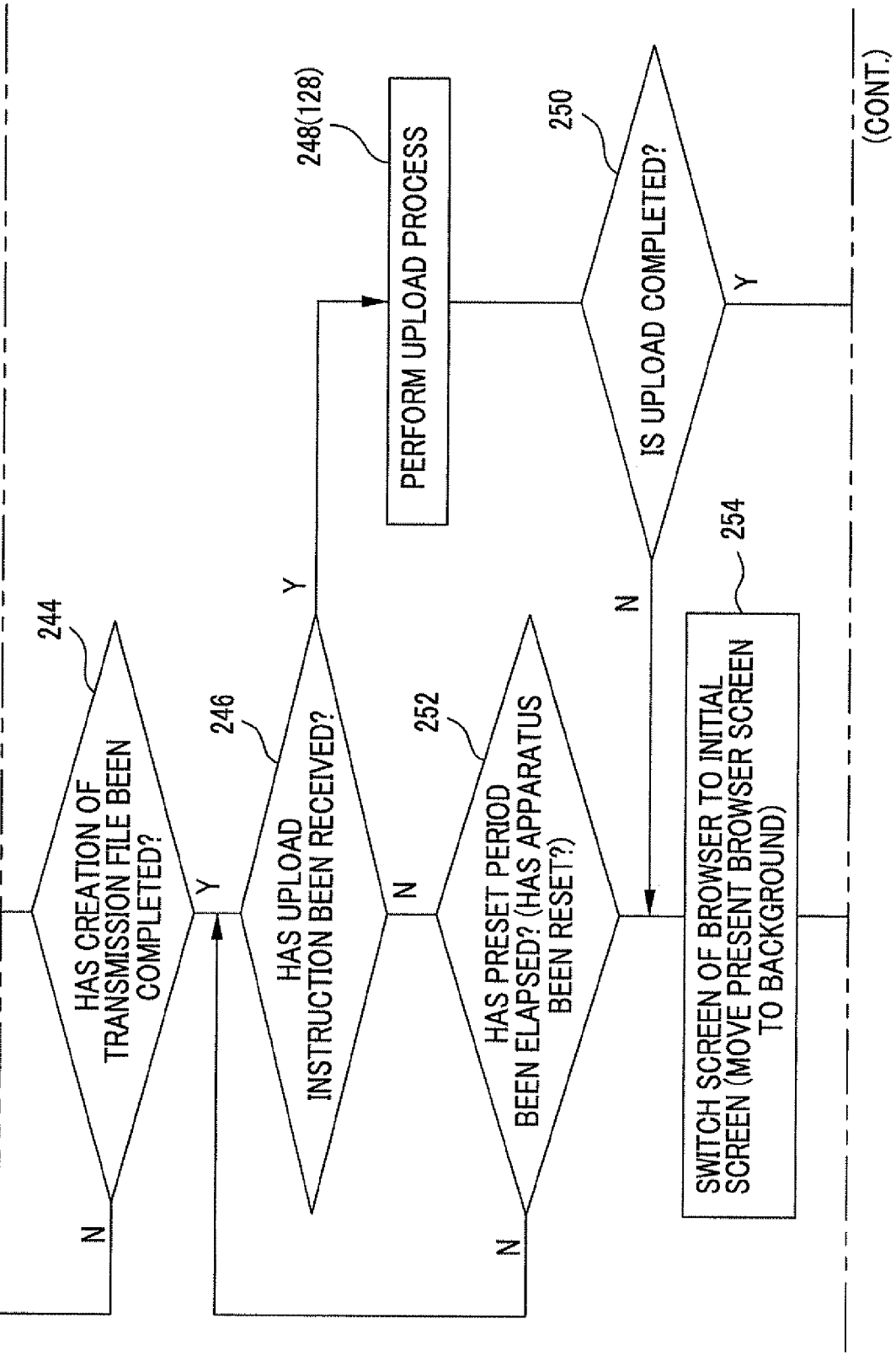

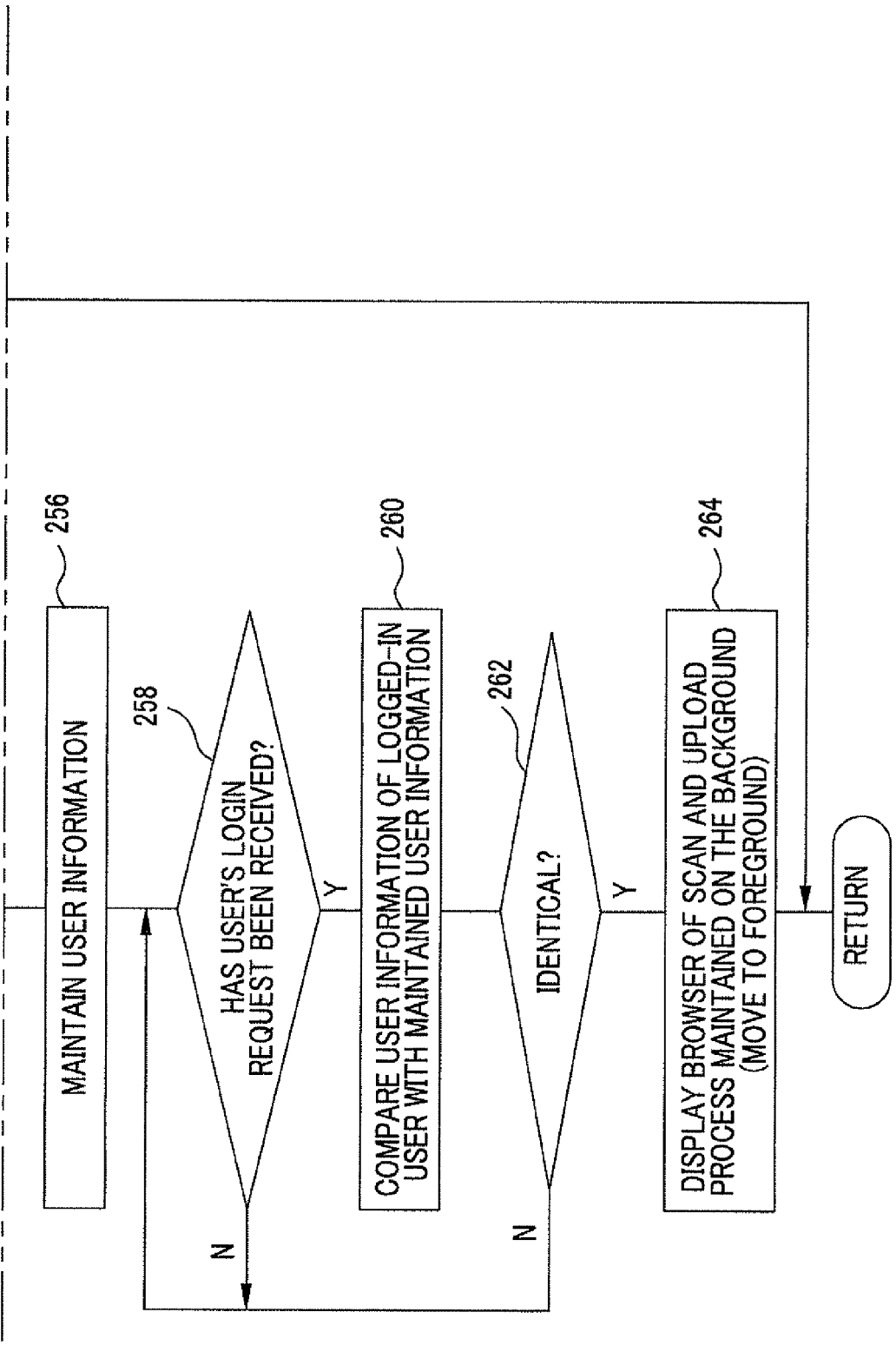

IMAGE PROCESSING DEVICE FOR READING AND TRANSMITTING AN IMAGE IN A NON-DISPLAY STATE

CROSS-REFERENCE TO RELATED APPLICATIONS

This application is based on and claims priority under 35 USC 119 from Japanese Patent Application No. 2012-068176 filed Mar. 23, 2012.

BACKGROUND (i) Technical Field

The present invention relates to an image processing device, an image forming apparatus, a non-transitory computer readable medium storing an image processing program, and an image processing method.

(ii) Related Art

An image forming apparatus which has a browser function in addition to a print function of forming an image on an image recording medium and a scanner function of reading an image formed on a document is known. Such an image forming apparatus displays a hyper text markup language (HTML) form acquired from a web server using a browser function and receives various services provided from a web server using a distributed application.

In the scan data uploading service, an instruction to execute scanning of a document image is input into the HTML form displayed on a browser, scan data is generated based on this instruction, and then a transmission file is created based on the scan data. After that, an upload instruction (submit instruction) is input into the HTML form, whereby the transmission file is uploaded to the web server.

However, when there are a number of documents to be uploaded, a long period of time is required before the scan data is generated after the scanning function is executed. Moreover, since a compression process or the like is performed on the scan data when a transmission file is created, another period of time is required before the scan data can be uploaded. Moreover, in the HTML form, unless the upload instruction is input in a state where uploading of input data is possible, it is not possible to upload the input data to the web server. For example, if an upload instruction is input when scan data is still being generated, only data which can be transmitted at that point in time is transmitted. As a result, incomplete scan data which is not the whole part of the scan data is uploaded to the web server. In order to prevent the uploading of such incomplete scan data, the upload instruction may be disabled until generation of scan data and creation of a transmission file are completed.

Moreover, when the upload instruction is input after the elapse of a period of time sufficient for completing the generation of scan data and the creation of a transmission file, the scan data is uploaded to the web server.

However, the image forming apparatus performs a reset operation of returning to an initial state after power-on when a preset period has elapsed. Thus, in the image forming apparatus, when the scan data is left without inputting the upload instruction, the scan data may be deleted with the reset operation of the image forming apparatus.

SUMMARY

According to an aspect of the invention, there is provided an image processing device including: a display control unit that displays any one of plural processing screen data including screen data provided by a server device on a display unit and executes an instructed process according to a display screen data; a receiving unit that receives, on the screen data provided by the server device, displayed on the display unit, a read instruction of causing an image reading unit to read a document image and a transmission instruction for storing image data corresponding to the read document image in the server device; an instruction maintaining unit that maintains the transmission instruction received by the receiving unit; and a reading and transmission executing unit that executes reading of the document image based on the read instruction and executes the transmission instruction maintained in the instruction maintaining unit with respect to the image data obtained by the reading after the reading is completed.

BRIEF DESCRIPTION OF THE DRAWINGS

Exemplary embodiments of the present invention will be described in detail based on the following figures, wherein:

FIGS. 6A and 6B are configuration diagrams showing an example of an instruction screen based on an HTML, form, in which FIG. 6A illustrates a case where a scan instruction is input, and FIG. 6B illustrates a case where an upload instruction is input;

FIG. 12 is a flowchart illustrating an example of moving from a background to a foreground;

FIG. 13 is a flowchart illustrating an example of a process of providing a screen capture according to a request of an image processing terminal; and FIG. 14 is a flowchart illustrating an example of a process of a scan and upload process in a case that the upload is not completed.

DETAILED DESCRIPTION

Figure 1:
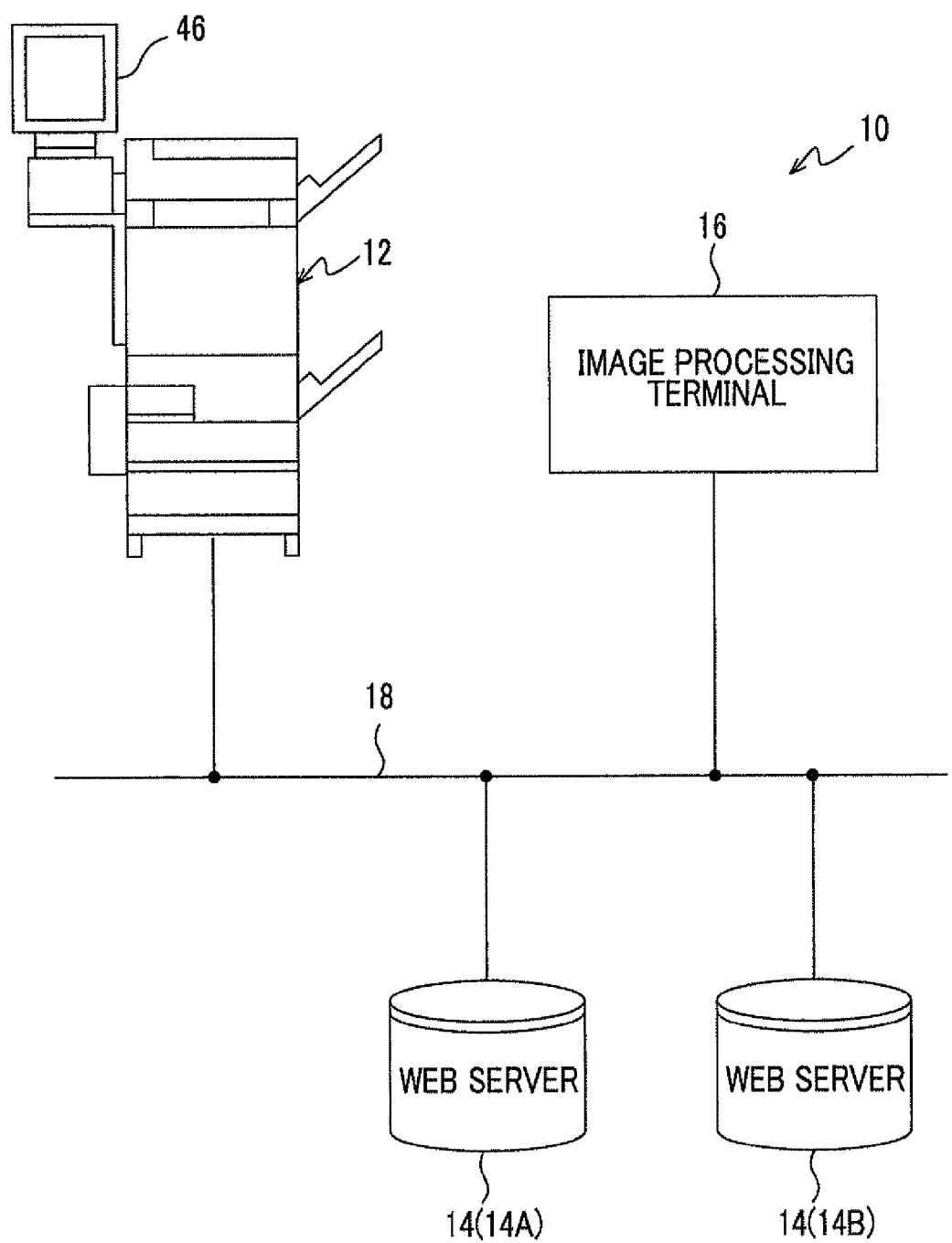
FIG. 1 is a configuration diagram illustrating an example of an image processing system according to an exemplary embodiment.

Hereinafter, an exemplary embodiment of the invention will be described with reference to the drawings. FIG. 1 illustrates a schematic configuration of an image processing system 10 according to an exemplary embodiment. The image processing system 10 includes an image forming apparatus 12. The image forming apparatus 12 includes the function of an image processing device and the function of an image forming apparatus.

Moreover, the image processing system 10 includes web servers 14 (for example, web servers 14A and 14B, hereinafter referred collectively to as a web server 14) and an image processing terminal 16, and the image forming apparatus 12, the web server 14, and the image processing terminal 16 are connected via a network 18.

In the image processing system 10, the image forming apparatus 12, the web server 14, and the image processing terminal 16 transmit and receive data to and from each other via the network 18. The image processing system 10 may include plural image forming apparatuses 12, plural web servers 14, and plural image processing terminals 16.

Figure 2:
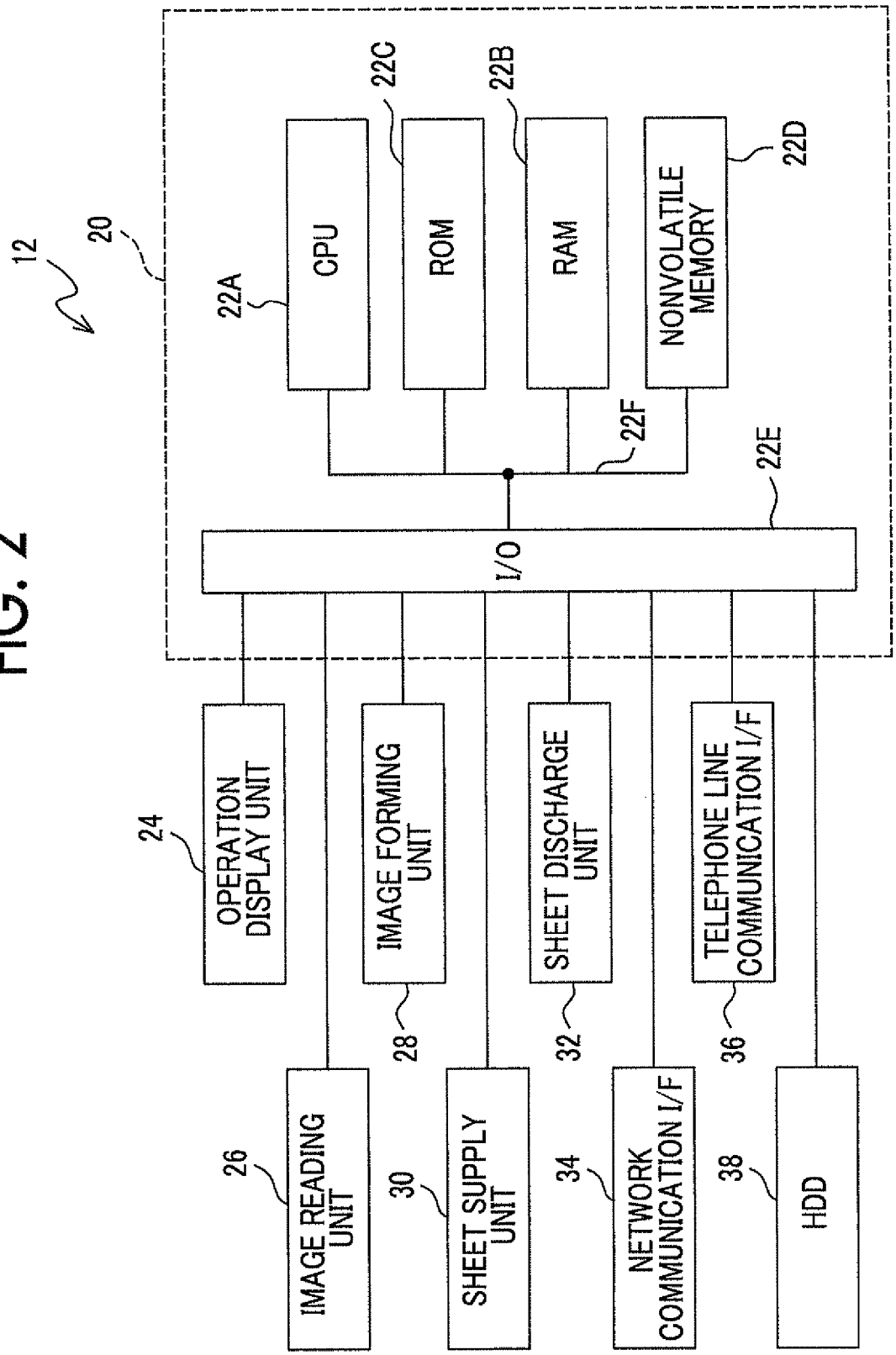
FIG. 2 is a configuration diagram illustrating an example of an image forming apparatus according to an exemplary embodiment.

As illustrated in FIG. 2, the image forming apparatus 12 includes a computer 20. The computer 20 includes a CPU 22A, a RAM 22B, a ROM 22C, a nonvolatile memory 22D, and an input/output interface (I/O) 22E which are connected by a bus 22F.

The input/output interface 22E is connected to an operation display unit 24, an image reading unit 26, an image forming unit 28, a sheet supply unit 30, a sheet discharge unit 32, a network communication interface unit 34, a telephone line communication interface unit 36, a hard disk (HDD: hard disk drive) 38, and the like. The HDD 38 may be used as the nonvolatile memory 22D.

The image reading unit 26 includes an image reading sensor such as a line CCD and a scanning mechanism for scanning the image reading sensor, and reads an image of a document loaded on the apparatus to thereby generate image data (also referred to as scan data).

The image forming unit 28 forms an image on a recording medium such as a recording sheet according to an electrophotographic method, for example. Specifically, the image forming unit 28 includes a charging unit for charging a photosensitive member such as a photosensitive drum and an exposure unit that forms an electrostatic latent image by scanning and exposing the charged photosensitive member according to image data. Moreover, the image forming unit 28 includes a developing unit that forms a toner image corresponding to the electrostatic latent image by visualizing the electrostatic latent image on the photosensitive member with toner and a transfer unit that transfers the toner image from the photosensitive member to the recording medium. Further, the image forming unit 28 includes a fixing unit that applies pressure and heat to the recording medium to which the toner image is transferred to thereby fix the toner image onto the recording medium and form an image corresponding to the image data on the recording medium.

The sheet supply unit 30 supplies a recording sheet to be used as a recording medium to the image forming unit 28, and the sheet discharge unit 32 stores the recording medium on which an image is formed and which is discharged from the image forming unit 28. The image forming unit 28 is not limited to the electrophotographic method, and an ink jet method or the like in which an image is formed by ejecting ink droplets onto a recording medium according to image data can be applied, for example.

The network communication interface unit 34 is used when the web server 14 and the image processing terminal 16 perform data communication via the network 18 (see FIG. 1). Moreover, the telephone line communication interface unit 36 is used when the image forming apparatus performs facsimile communication by connecting to another image forming apparatus or the like via a telephone line (not illustrated).

Image data such as scan data generated by the image forming apparatus 12 and various types of data such as log data generated according to the operation of the image forming apparatus 12 are stored in the HDD 38. The CPU 22A executes various types of processes based on a program and data stored in the ROM 22C, the nonvolatile memory 22D, the HDD 38, or the like. The execution program of the CPU 22A may be provided via a portable storage medium, the network 18, or the like. In this way, the image forming apparatus 12 includes a scanning function, a printing function, a copying function, and a facsimile function.

Figure 3:
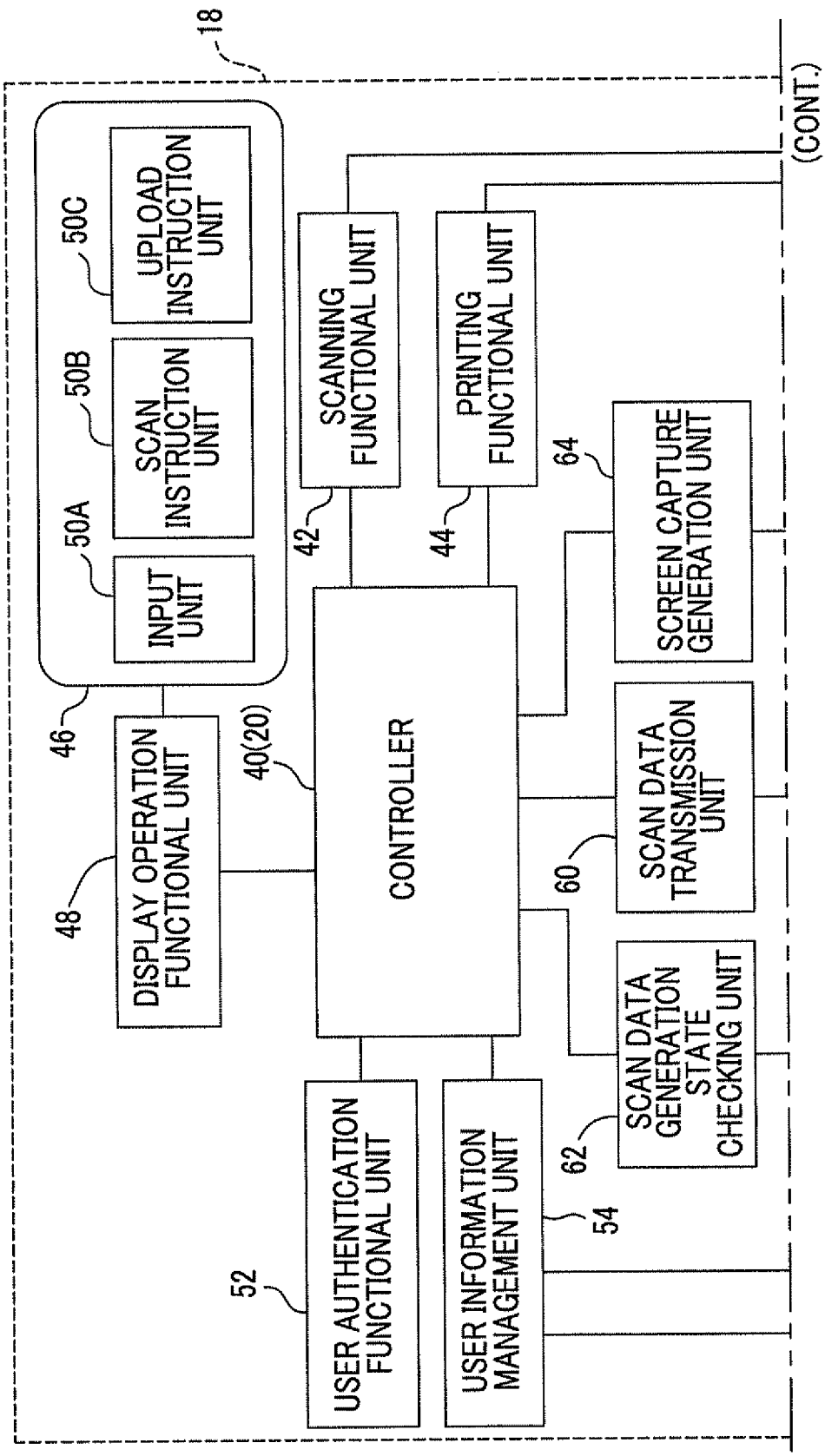
FIG. 3 is a functional block diagram of the image forming apparatus.

FIG. 3 illustrates a functional block diagram of the functional blocks which are formed in the image forming apparatus 12 when the CPU 22A of the computer 20 executes the program. The image forming apparatus 12 includes a controller 40 that is formed by the computer 20, and a scanning functional unit 42 and a printing functional unit 44 are connected to the controller 40. The scanning functional unit 42 is formed when the image reading unit 26 is controlled by the computer 20, and reads a document image to generate image data (scan data).

The printing functional unit 44 is formed when the image forming unit 28, the sheet supply unit 30, and the sheet discharge unit 32 are controlled by the computer 20, and forms an image corresponding to the image data on a recording medium. The image forming apparatus 12 forms an image on a recording medium based on the image data of the document image by using the scanning functional unit 42 and the printing functional unit 44 (copying function).

Moreover, the image forming apparatus 12 includes a touch panel-type monitor 46 (see FIG. 1) which is provided in the operation display unit 24. The image forming apparatus 12 includes a display operation functional unit 48 which is formed when the CPU 22A controls the operation display unit 24. The display operation functional unit 48 allows the touch panel-type monitor 46 to function as an input unit 50A for inputting various input operations, and a scan instruction unit 50B and an upload instruction unit 50C which are described later. Moreover, in the image forming apparatus 12, the display operation functional unit 48 functions as a receiving unit when the monitor 46 functions as the input unit 50A and the like.

The image forming apparatus 12 includes a browser function, and the controller 40 executes a process such as image processing based on a processing instruction received from the screen of a browser displayed on the monitor 46.

On the other hand, the image forming apparatus 12 includes a user authentication functional unit 52 and a user information management unit 54. A person (hereinafter referred to as a user) who uses the image forming apparatus 12 logs into the image forming apparatus by performing user authentication. The user having logged into the image forming apparatus 12 uses various functions based on the screen of the browser displayed on the monitor 46.

The image forming apparatus 12 stores registration information (hereinafter referred to as user information) of each user in the HDD 38 when the users are registered, for example. The user authentication functional unit 52 performs user authentication by reading user information from an ID card of the user, for example, and comparing the read user information with user information stored in the HDD 38 as authentication information. The image forming apparatus 12 allows the login of an authenticated user when the user authentication functional unit 52 authenticates the user. When user authentication is performed using an ID card, the image forming apparatus 12 may include a card reader that reads user information from the ID card. Moreover, the user authentication is not limited to the ID card but an existing method can be applied.

The user information management unit 54 maintains the user information of a logged-in user. The user information management unit 54 uses the user information of a logged-in user when connecting the image forming apparatus 12 to the web server 14, for example. In addition, the user information management unit 54 deletes the stored user information at a preset timing such as when a preset period of time has elapsed with no operation input to the image forming apparatus 12 or when the user ends the operation on the image forming apparatus 12. In this way, a new user can log into the image forming apparatus 12.

On the other hand, the web server 14 includes a server controller 56 that controls the operation of the web server 14 and a memory 58 that is formed using a nonvolatile storage medium such as a HDD. The web server 14 provides various services to the image forming apparatus 12 or the like. For example, the web server 14 stores uploaded data in the memory 58 when uploading of data is requested (instructed) from the image forming apparatus 12 or the like.

A personal computer (PC), for example, is used as the image processing terminal 16. The image processing terminal 16 performs generation, editing, or the like of the image data using various applications. The image processing terminal 16 connects to the image forming apparatus 12 when the user performs user authentication on the image forming apparatus 12 via the image processing terminal 16. In this way, the image processing terminal 16 transmits image data to the image forming apparatus 12 and performs printing of an image corresponding to the image data. Moreover, the image processing terminal 16 receives a service provided by the web server 14 via the image processing terminal 16 and uploads data such as image data to the web server 14, for example.

The image forming apparatus 12 receives various services from the web server 14 by connecting to the web server 14. The services that the web server 14 provides to the image forming apparatus 12 includes a service of uploading image data (scan data) generated using the scanner function of the image forming apparatus 12 to the web server 14. Hereinafter, this service will be referred to as a scan and upload process.

When the image forming apparatus 12 receives the service from the web server 14, the image forming apparatus 12 sends a request for a hyper text markup language (HTML) form to the web server 14 from the browser displayed on the monitor 46 and displays a screen corresponding to the requested form on the browser. When performing the scan and upload process, the image forming apparatus 12 displays the screen of the HTML form used for the scan and upload service on the browser and generates scan data when a scan instruction (an operation of the scan instruction unit 50B) is input from the display screen.

Moreover, the image forming apparatus 12 transmits a transmission file created based on the scan data to the web server 14 when an upload instruction (an operation of the upload instruction unit 50C) is input from the display screen of the browser.

On the other hand, the image forming apparatus 12 includes a scan data transmission unit 60, a scan data generation state checking unit 62, and a screen capture generation unit 64.

The scan data transmission unit 60 performs preset data processing such as a compression process on the scan data generated by the scanning functional unit 42 during the scan and upload process and creates an upload transmission file. Moreover, when creation of the transmission file of the scan data is completed, the scan data transmission unit 60 transmits the created transmission file to the web server 14 in response to an upload instruction.

When the scan and upload process is performed, the scan data generation state checking unit 62 checks the processing state of the scanning functional unit 42 and the scan data transmission unit 60. The screen capture generation unit 64 generates a screen capture according to the generation state of the scan data checked by the scan data generation state checking unit 62.

The image forming apparatus 12 displays the screen capture generated by the screen capture generation unit 64 on the monitor 46 and informs the user of the progress state of the scan and upload process. The transmitted scan data (transmission file) and the screen capture are stored in the HDD 38.

On the other hand, in response to the scan and upload instruction, the image forming apparatus 12 executes the scan and upload process on the background by switching the display screen of the monitor 46 at a preset timing. That is, the image forming apparatus 12 executes the display of the monitor 46 and the process based on the display of the monitor 46 on the foreground. Moreover, the image forming apparatus 12 executes the scan and upload process on the background by not displaying the screen capture on the monitor 46.

The image processing terminal 16 includes a screen display unit 66 for displaying various types of information on a monitor (not illustrated). When executing the scan and upload process on the background, the image forming apparatus 12 transmits the data of the screen capture to the image processing terminal 16 in response to a request from the image processing terminal 16. Upon receiving the data of the screen capture, the screen display unit 66 of the image processing terminal 16 displays the screen capture on the monitor (not illustrated).

Next, the scan and upload process in the image forming apparatus 12 will be described. The user who uses the image forming apparatus 12 logs into the image forming apparatus 12 by performing user authentication.

Figure 4:
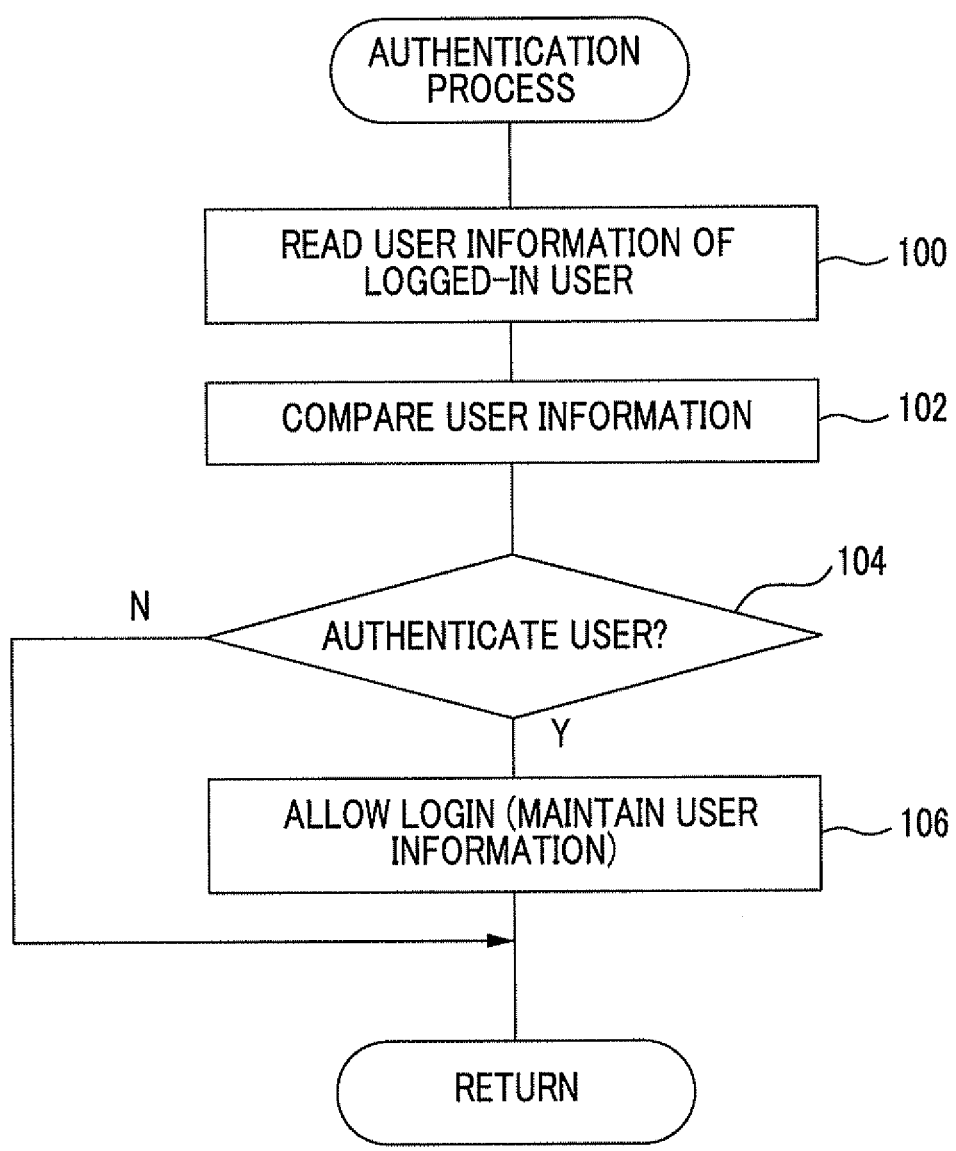
FIG. 4 is a flowchart illustrating an example of user authentication.

FIG. 4 is a flowchart illustrating an example of a user authentication process. This flowchart is executed when an initial screen (menu screen) of the image forming apparatus 12 is displayed on the monitor 46, for example, and in step S100, the user information of the logging user is read. In step S102, the read user information is compared with the user information (for example, the user information stored in the HDD 38) that is registered in advance.

In this way, the user is authenticated by the image forming apparatus 12 (step S104: Y), and the user can log into the image forming apparatus 12 (step S106). Moreover, when logging-in of the user is allowed, the image forming apparatus 12 maintains the user information of the user until the user is logged out.

Figure 5:
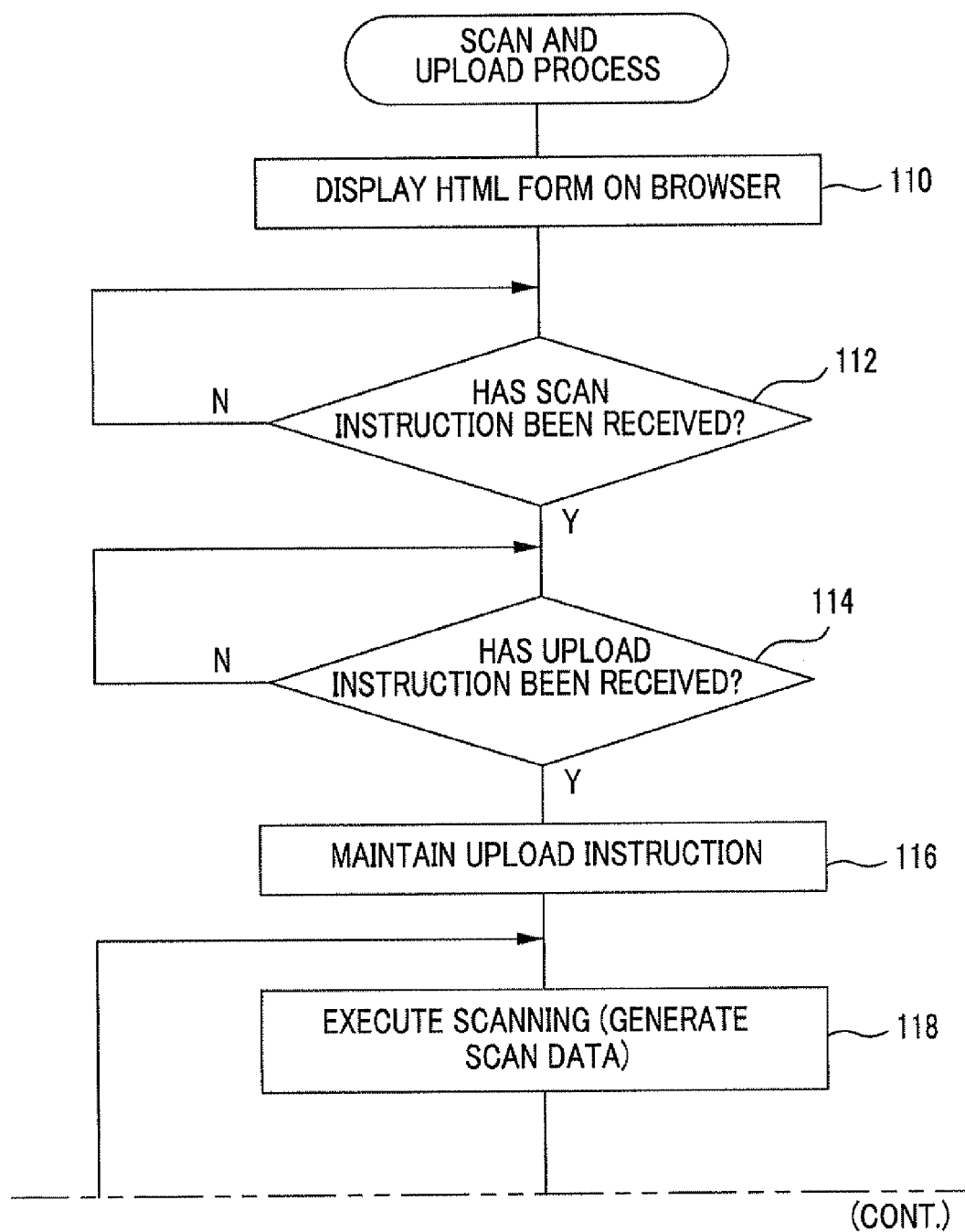
FIG. 5 is a flowchart illustrating an example of a basic scan and upload process.

The user can use the scan and upload function by logging into the image forming apparatus 12. FIG. 5 is a flowchart illustrating an example of the scan and upload process executed by the image forming apparatus 12. When executing the scan and upload process, first, the image forming apparatus 12 sends a request for an HTML form for executing the scan and upload process to the web server 14 to which the scan data will be uploaded using a browser function. In step S110, upon receiving the HTML form transmitted from the server controller 56 of the web server 14 based on this request, the image forming apparatus 12 displays the screen of the HTML form on the monitor 46 using the browser function.

FIG. 6A illustrates an example of an instruction screen displayed at that time. On the instruction screen 70, a scan button 74 and an upload button 76 are displayed together with a box 72 in which a file name to be uploaded is input. The scan button 74 and the upload button 76 correspond to the scan instruction unit 50B and the upload instruction unit 50C, respectively.

Figure 7:
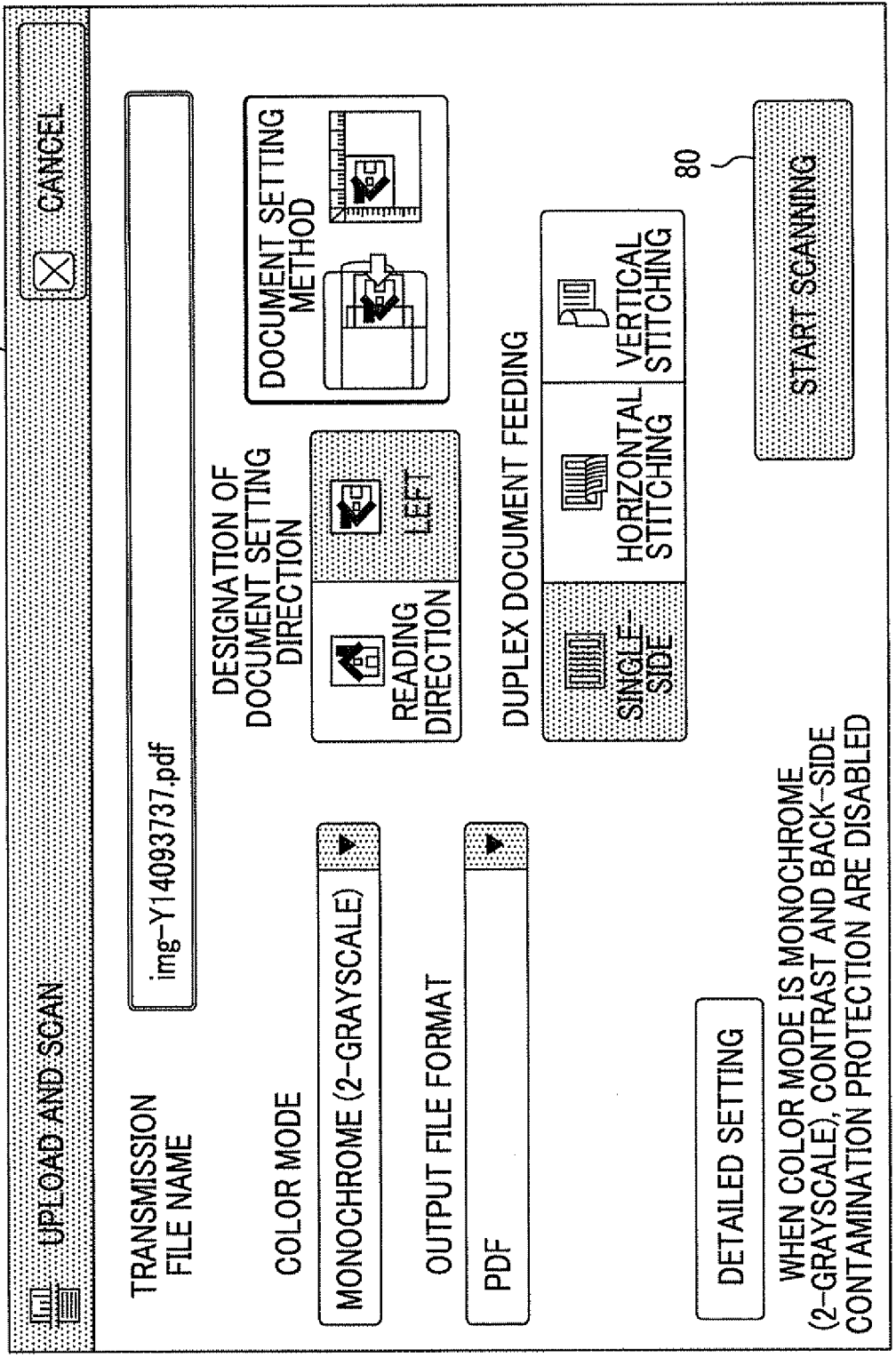
FIG. 7 is a configuration diagram illustrating an example of a scan setting screen.

The image forming apparatus 12 displays a setting screen for performing scanning when the scan button 74 is pressed (operated). FIG. 7 illustrates an example of the setting screen. On the setting screen 78, a file name to be transmitted is input, and a color mode and an output file format (file format of scan data) are selected from a pulldown menu. Moreover, a document setting direction, a document setting method, and a both-sided document feeding method when performing scanning are selected on the setting screen 78.

The image forming apparatus 12 starts reading a document image based on the settings when a scan start button 80 is operated in a state where the respective items are set on the setting screen 78.

Figure 6B:
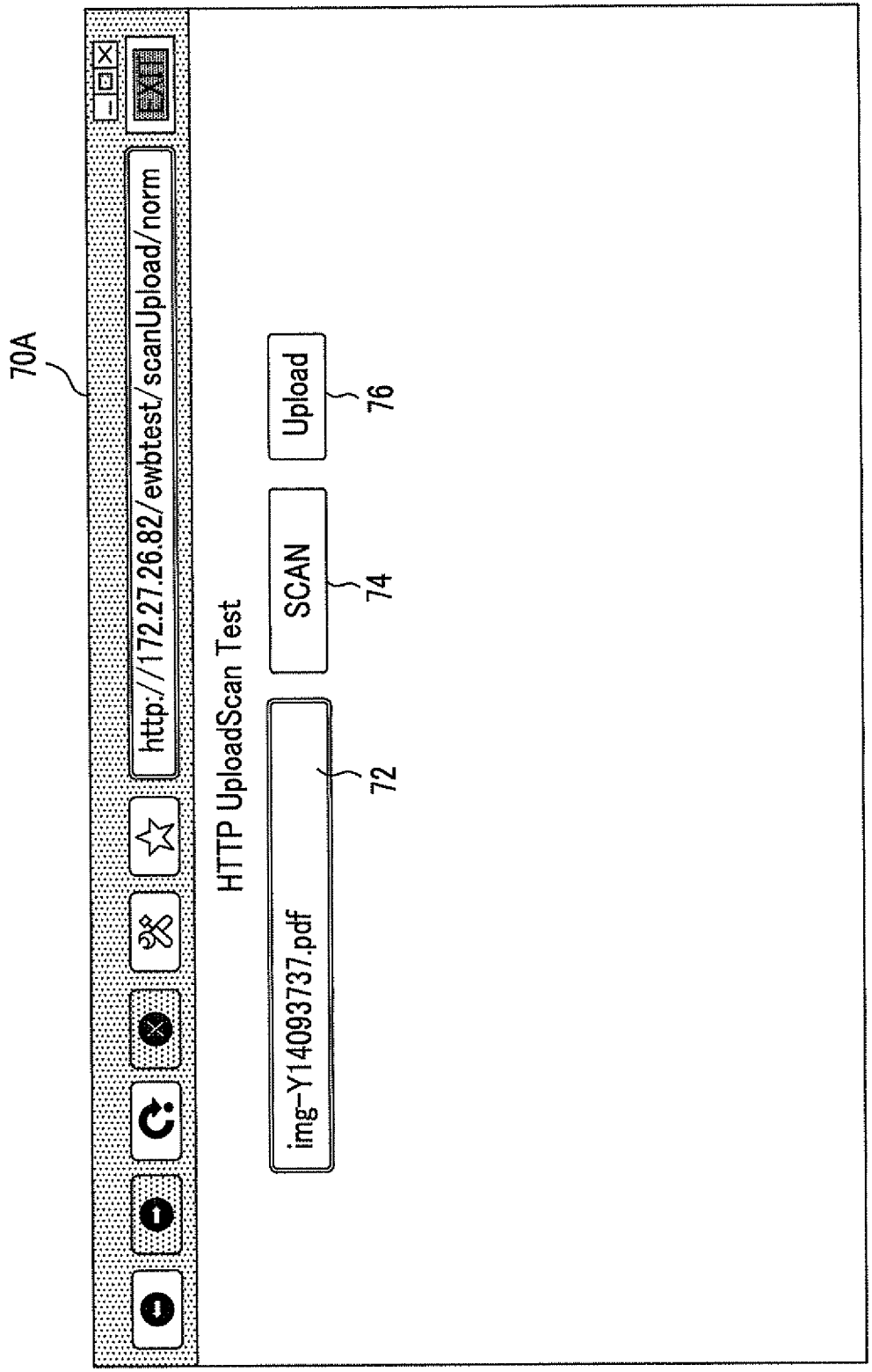

Moreover, the image forming apparatus 12 switches the screen of the browser when the scan start button 80 is operated. FIG. 6B illustrates an example of the display screen displayed at that time. This instruction screen 70A is the instruction screen 70 in which a file name to be transmitted is input. In the image forming apparatus 12, the input of the scan and upload instruction by the user is completed when the upload button 76 is operated on the instruction screen 70A.

In the flowchart illustrated in FIG. 5, when the scan button 74 is operated on the instruction screen 70, a positive determination result is obtained in step S112, and the flow proceeds to step S114. Moreover, in step S114, when the upload button 76 is operated on the instruction screen 70A, a positive determination result is obtained, and the flow proceeds to step S116.

In step S116, the scan data transmission unit 60 maintains the upload instruction, and in step S118, reading of the document image based on the scan instruction is started (scanning is executed). When reading of the document image is completed, and scan data is generated, the flow proceeds to step S120, and the image forming apparatus 12 converts the scan data into a file format set to the setting screen 78 and executes a preset process such as a compression process to thereby create a transmission file.

At the same time, the image forming apparatus 12 displays a screen capture being scanned on the monitor 46 (step S122). In the image forming apparatus 12, the scan data generation state checking unit 62 checks the scanning state of the document image and the creation state of the transmission file, and the screen capture generation unit 64 creates a screen capture indicating the scanning state in accordance with the checking result.

In general, according to the HTML form acquired from the web server 14, when the upload button 76 is operated on the instruction screen 70 (70A), an upload instruction according to the hyper text transfer protocol (HTTP) is transmitted to the web server 14. Based on this upload instruction, the server controller 56 of the web server 14 tries to receive a transmission file that is to be transmitted continuously. In this case, the scan and upload process does not end unless creation of the transmission file is completed.

In contrast, when the upload button 76 is operated, the image forming apparatus 12 maintains the upload instruction without transmitting the upload instruction to the web server 14 and starts scanning (generating the scan data) the document image and creating the transmission file. In this case, the image forming apparatus 12 displays the generation state of the scan data on the monitor 46.

Figure 8:
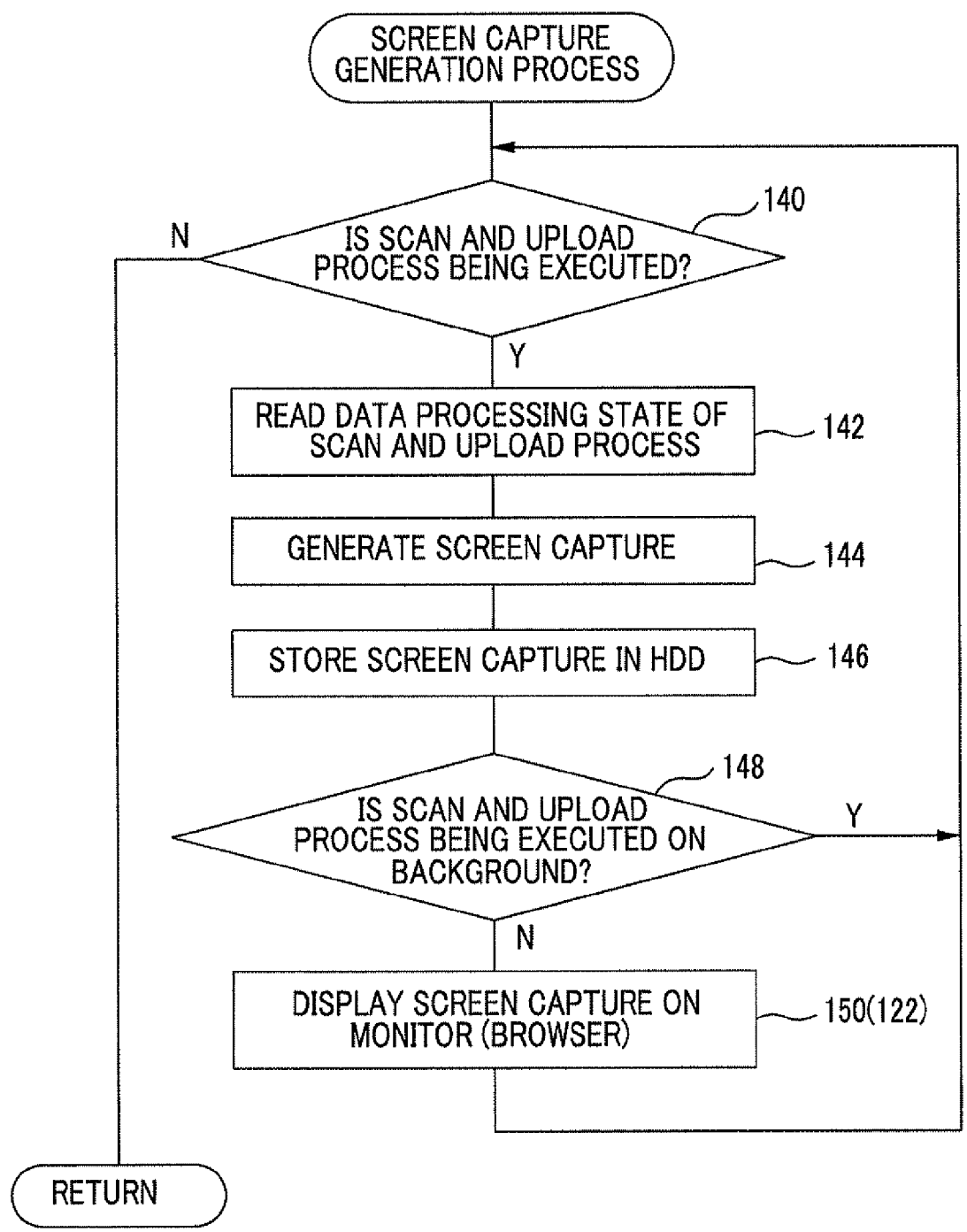
FIG. 8 is a flowchart illustrating an example of a process of generating a screen capture of the state of the scan and upload process.

FIG. 8 illustrates an example of a screen capture generation process. In step S140, it is checked whether a scan and upload process is being executed, and a positive determination result is obtained when the scan and upload process is being executed. Then, the flow proceeds to step S142.

In step S142, the scan data generation state checking unit 62 checks a data processing state. Moreover, in step S144, the screen capture generation unit 64 generates a screen capture indicating the processing state based on the checking result of the data processing state. In step S146, the generated screen capture is stored in the HDD 38, for example. In step S148, it is checked whether the scan and upload process is executed on the background.

Here, when the scan and upload process is executed on the foreground, a positive determination result is obtained in step S148, and the image forming apparatus 12 proceeds to step S150. Step 150 corresponds to step S122 of FIG. 5, and the screen capture generated by the screen capture generation unit 64 is displayed on the monitor 46.

Figure 9:
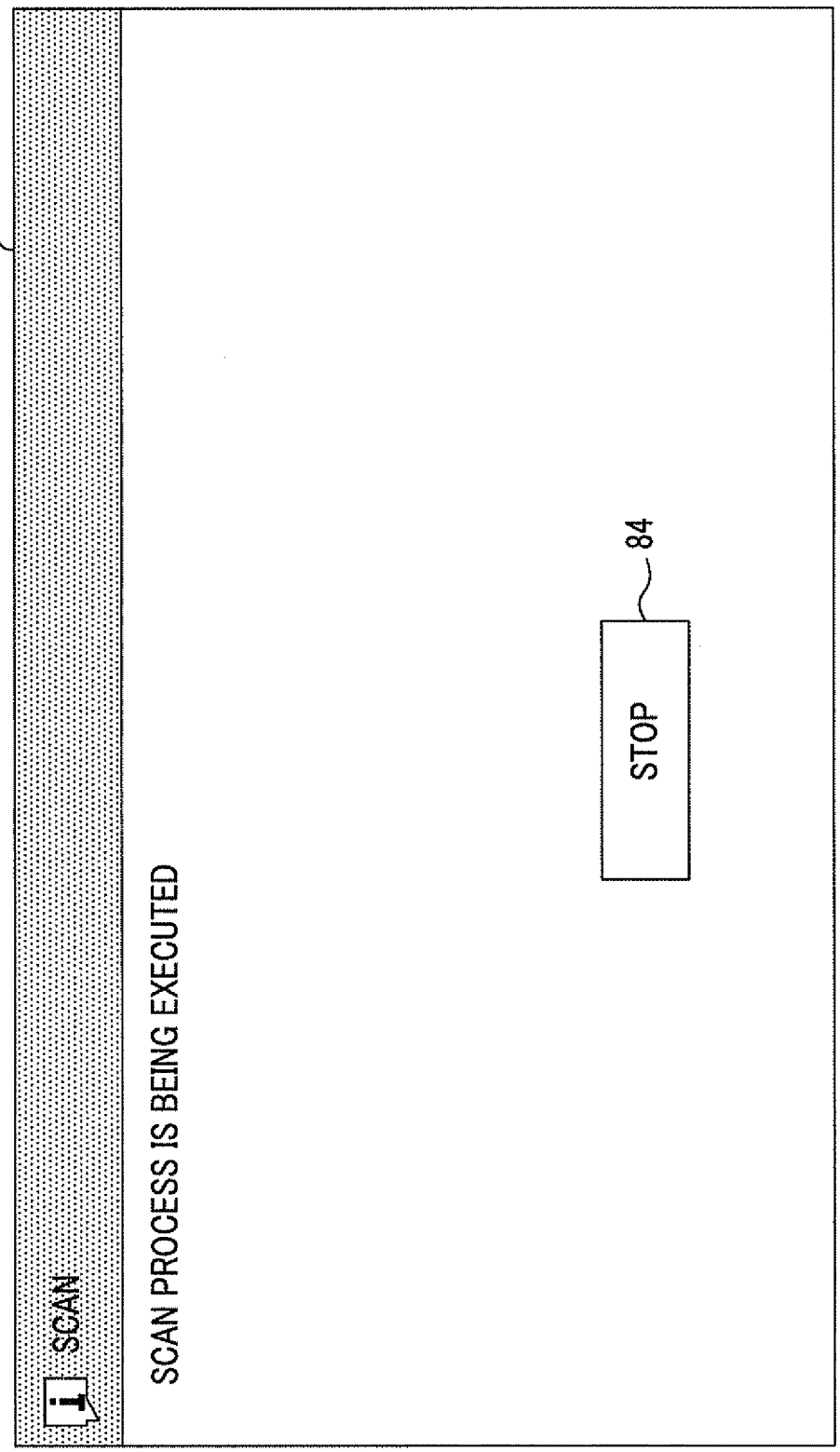
FIG. 9 is a screen configuration diagram of an example of a screen capture.

FIG. 9 illustrates an example of a display screen displayed in the browser on the monitor 46 as a screen capture. This display screen 82 shows that a scan process of the scan and upload process is being executed. A halt button 84 is provided on the display screen 82, and when the halt button 84 is operated, the scan process, namely the scan and upload process which has been instructed to be executed can be stopped. The screen capture is not limited to this, and an appropriate display indicating the progress state of the scan and upload process may be used.

On the other hand, in step S124 of FIG. 5, it is checked whether generation of scan data (that is, reading of a document image) and creation of a transmission file using the scan data have been completed. In the image forming apparatus 12, when creation of the transmission file of the scan data is completed, a positive determination result is obtained in step S124, and the flow proceeds to step S126. In step S126, the upload instruction which has been maintained is read. In step S128, the upload instruction is transmitted to the web server 14, and transmission (uploading) of the transmission file is started. In this case, the image forming apparatus 12 transmits the user information of the logged-in user to the web server 14 to thereby perform authentication to the web server 14.

The web server 14 starts receiving the transmission file when the user of the image forming apparatus 12 is authenticated. Moreover, the web server 14 stores the received transmission file in the memory 58. When uploading of all of the created transmission files ends, a positive determination result is obtained in step S130, and the image forming apparatus 12 ends the scan and upload process.

On the other hand, when the image forming apparatus 12 has a multi-tasking function, and an upload instruction of the scan and upload process is input, the image forming apparatus 12 enables the generation of the scan data, the creation of the transmission file, and the uploading of the created transmission file to be executed on the background.

Figure 10:
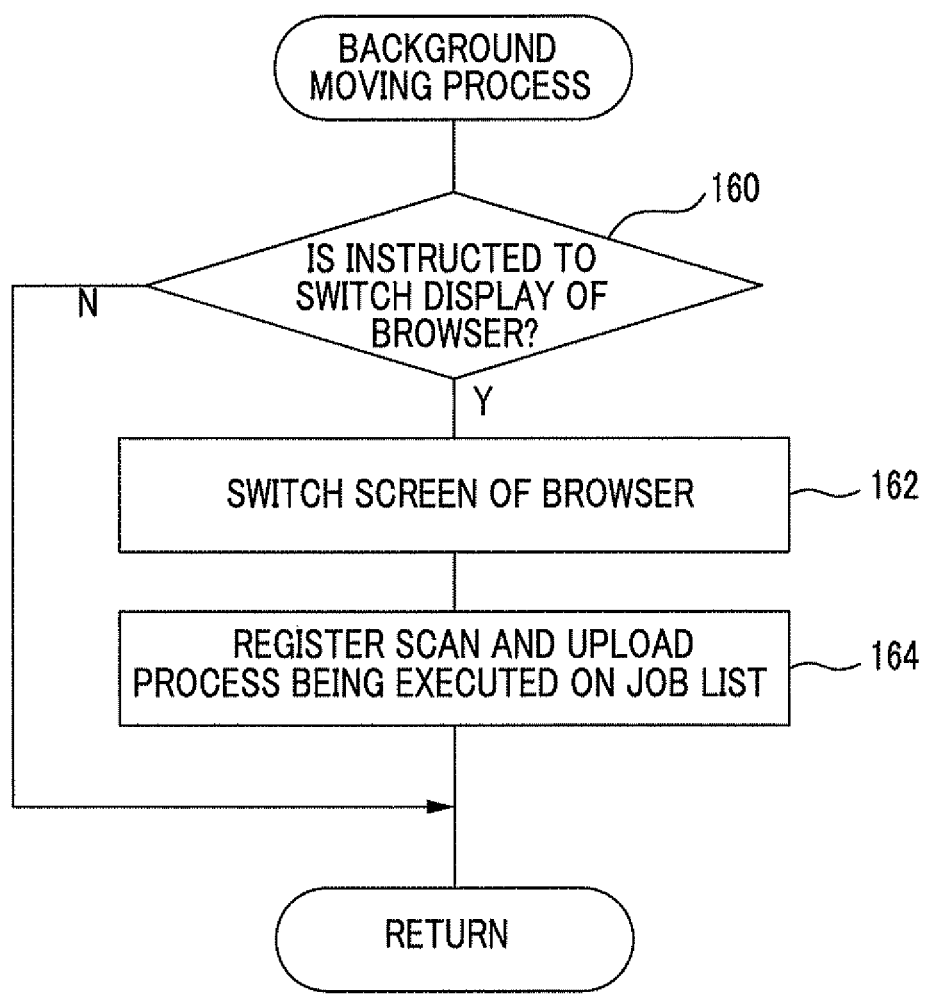
FIG. 10 is a flowchart illustrating an example of a background moving process.

FIG. 10 is a flowchart illustrating an example of a process moved to the background in the image forming apparatus 12. This flowchart is executed when the flow proceeds to step S118 of FIG. 5. In step S160, it is checked whether an instruction to switch the display screen of the browser displayed on the monitor 46 has been received.

Here, for example, since the user who has issued the scan and upload instruction departs from the image forming apparatus 12, the display screen of the browser is switched to an initial screen (menu screen) set in advance to the image forming apparatus 12. In this way, in the image forming apparatus 12, a positive determination result is obtained in step S160.

Moreover, the image forming apparatus 12 can use other functions during the execution of the scan and upload process. For example, if reading of the document image of the scan and upload process has ended, the image forming apparatus 12 can use a scanner function and a copying function.

Moreover, the image forming apparatus 12 can use the printing function during the scan and upload process.

Further, when a preset period has elapsed in a state where no operation such as an instruction to execute a new process has been input, the image forming apparatus 12 is reset and the display screen of the browser is switched to the initial screen.

In either case, in the image forming apparatus 12, a positive determination result is obtained in step S160, the flow proceeds to step S162, and the screen of the browser displayed on the monitor 46 is switched to a designated screen such as an initial screen. In this case, the image forming apparatus 12 maintains the screen capture indicating that the scan and upload process is being executed on the background (for example, the screen capture is maintained in the HDD 38). At the same time, the flow proceeds to step S164, and the image forming apparatus 12 registers the scan and upload process that moves to the background on a job list.

In this way, the image forming apparatus 12 can execute the scan and upload process on the background and execute the process based on the display screen of the browser on the monitor 46 on the foreground. In the image forming apparatus 12, when the scan and upload process is performed on the background, a preset icon, for example is displayed on the display screen of the browser on the monitor 46 to thereby indicate that the scan and upload process is being executed on the background. Moreover, the scan and upload process registered on the job list is deleted from the job list when the scan and upload process is completed. Further, in this example, although the scan and upload process moved to the background is registered as the list of jobs being executed, the registering on the job list may be not performed.

Figure 11:
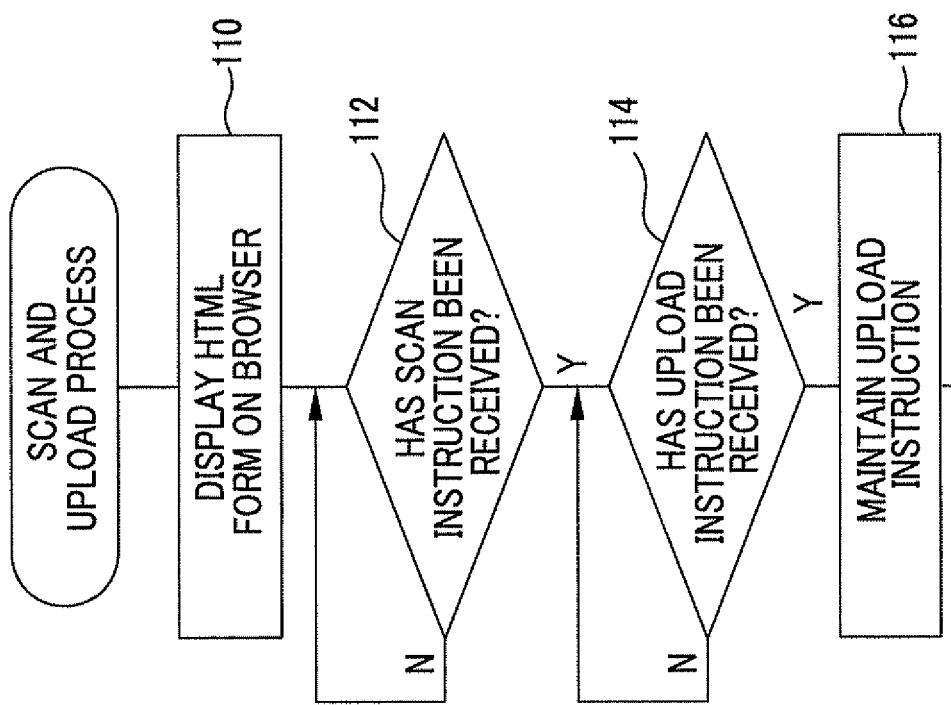
FIG. 11 is a flowchart illustrating an example of a scan and upload process in a case of a background moving.

FIG. 11 illustrates the flow of a process when the scan and upload process is moved to and executed on the background. In FIG. 11, the same processes as those of FIG. 5 are denoted by the same step numbers, and description thereof is not provided.

In FIG. 11, during the scan and upload process, when a negative determination result is obtained in step S124, the flow proceeds to step S170. In step S170, it is checked whether the process is to be moved to the background. Here, when the display screen of the browser on the monitor 46 is switched (step S162 of FIG. 10), a positive determination result is obtained in step S170, and the flow proceeds to step S172. In step S172, the user information of the user having input the scan and upload instruction is read, and the user information is maintained together with the upload instruction.

After that, in steps S174 and S176, the scan and upload process is started on the background. In the scan and upload process, the scan process and the transmission file creation process in steps S218 and S120 are continued. In this example, although the scan and upload process is moved to the background even when the scan process is being executed, the scan and upload process may be moved to the background after the scan process ends. In this case, step S176 is executed on the background.

In the image forming apparatus 12, when the scan and upload process is moved to the background, the screen capture generation unit 64 generates a screen capture based on the generation state of the scan data checked by the scan data generation state checking unit 62 in accordance with the execution of steps S174 and S176. In this case, in the image forming apparatus 12, since the scan and upload process is executed on the background, a negative determination result is obtained in step S148 of FIG. 8, the generation and updating of the screen capture are repeatedly performed without displaying the screen capture.

In step S178, it is checked whether the creation of the transmission file has ended. When the creation of the transmission file has ended, a positive determination result is obtained in step S178, and the flow proceeds to step S180. In step S180, the upload instruction which has been maintained is read. At the same time, in step S182, the user information which has been maintained when the scan and upload process is moved to the background is read.

Subsequently, in step S184, the user information and the upload instruction are transmitted to the web server 14 to upload the transmission file. When the uploading of the transmission file ends, a positive determination result is obtained in step S186, and the scan and upload process ends. When the scan and upload process is executed on the background, the upload instruction and the user information which have been maintained are deleted after the scan and upload process ends.

On the other hand, in the image forming apparatus 12, the scan and upload process is moved to the background, the functions of the image forming apparatus 12 can be used on the foreground. In this case, when a new user (a user different from the user having issued the scan and upload instruction) logs in, user authentication is performed as usual. Moreover, in the image forming apparatus 12, the scan and upload process which has been moved to the background can be returned to the foreground.

FIG. 12 illustrates an example of the process when the scan and upload process is returned to the foreground. In the image forming apparatus 12, the scan and upload process which has been moved to the background is registered on the job list (see step S164 of FIG. 10). The image forming apparatus 12 reads the scan and upload process which is executed on the background from the job list. The movement to the foreground is not limited to this.

In step S200 of FIG. 12, it is checked whether the scan and upload process is being executed on the background. In this case, when the scan and upload process is being executed on the background, a positive determination result is obtained in step 200, and the image forming apparatus 12 proceeds to step S202. In step S202, it is checked whether reading of the job list is instructed.

Here, if the display of the job list is requested when the scan and upload process is executed on the background, a positive determination result is obtained in step S202, and the image forming apparatus 12 proceeds to step S204.

In step S204, the user information of the user logged into the image forming apparatus 12 is read and compared with the user information which has been maintained when the scan and upload process is moved to the background. In step S206, it is checked whether the two items of user information are identical. Here, when the two items of user information are not identical, a negative determination result is obtained in step S206, and the process ends. In this way, the scan and upload process is continuously performed on the background.

In contrast, when the two items of user information are identical, a positive determination result is obtained in step S206, the image forming apparatus 12 proceeds to step S208, and the job list is displayed on the monitor 46. In this way, the scan and upload process being executed on the background is displayed on the job list.

In step S210, it is checked whether the scan and upload process being executed on the background is selected. When another job that is being executed is selected from the job list, or the display of another display screen is requested, a negative determination result is obtained in step S212, and the process of moving the scan and upload process to the foreground ends.

Here, when the scan and upload process being executed on the background is selected, a positive determination result is obtained in step S210, the flow proceeds to step S212, and the display screen of the browser of the monitor 46 is switched to the screen capture generated according to the data processing state of the scan and upload process. In the image forming apparatus 12, the display of the monitor 46 is switched to the screen capture of the scan and upload process, whereby the scan and upload process is moved to the foreground. That is, the scan and upload process is moved to the state of step S122 of FIG. 5, whereby the process of FIG. 5 is executed on the foreground.

On the other hand, in the image forming apparatus 12, when the scan and upload process is executed on the background of the image forming apparatus 12, it is possible to check the execution state from the image processing terminal 16 connected to the image forming apparatus 12 via a network.

FIG. 13 is a flowchart illustrating an example of the process when the execution state is checked from the image processing terminal 16. This flowchart is executed when a connection request is issued from the image processing terminal 16. In this case, the image processing terminal 16 accesses the image forming apparatus 12 from the browser displayed on a monitor (not illustrated). Moreover, the image processing terminal 16 requests user authentication by transmitting the user information of the user who is using the image processing terminal 16 when accessing the image forming apparatus 12.

In step S220 of FIG. 13, it is checked whether there is a connection request (access request) from the image processing terminal 16. When there is a connection request, a positive determination result is obtained in step S220, and the flow proceeds to step S222. In step S222, user authentication is performed based on the user information transmitted from the image processing terminal 16. The user authentication is performed according to the process of FIG. 4, for example.

When the user authentication ends, and the logging-in of the user from the image processing terminal 16 is allowed, a positive determination result is obtained in step S224, and the flow proceeds to step S226. In step S226, it is checked whether the scan and upload process has been executed on the background.

Here, when the scan and upload process has been executed on the background, a positive determination result is obtained in step S226, and the flow proceeds to step S228. In step S228, the user information of the user of the image processing terminal 16 is compared with the user information of the user who has issued the scan and upload instruction. In this way, when the two items of user information are identical, a positive determination result is obtained in step S230, and the flow proceeds to step S232. In step S232, the image forming apparatus 12 transmits the screen capture indicating the data generation state of the scan and upload process to the image processing terminal 16.

Upon receiving the screen capture of the scan and upload process transmitted from the image forming apparatus 12, the image processing terminal 16 displays the screen capture on the screen of the browser of a monitor (not illustrated).

In the above description, although the process is executed when both the scan instruction and the upload instruction are issued, the image forming apparatus 12 can issue the scan instruction to execute scanning and issue the upload instruction in a state where generation of the scan data and creation of the transmission file are completed.

FIG. 14 is a flowchart illustrating an example of the process where the scan instruction and the upload instruction are issued separated. In FIG. 14, the same processes as those of FIG. 5 are denoted by the same step numbers as used in FIG. 5, and description thereof is not provided.

In this flowchart, when the scan start button 80 is operated on the setting screen 78, a positive determination result is obtained in step S112. In this case, although the instruction screen 70A is displayed on the browser of the monitor 46, unless the upload button 76 is operated on the instruction screen 70, the flow proceeds to step S240, and a scan process is started to generate the scan data. In step S242, the transmission file based on the scan data is created.

In step S244, it is checked whether creation of the transmission file has been completed. When creation of the transmission file has been completed, a positive determination result is obtained in step S244, and the image forming apparatus 12 proceeds to step S246. In step S246, it is checked whether an upload instruction has been input from the instruction screen 70A of the browser.

Here, when the upload button 76 is operated on the instruction screen 70A and the upload instruction is input, a positive determination result is obtained in step S246, and the image forming apparatus 12 proceeds to step S248. In step S248, the created transmission file is uploaded to the web server 14.

After that, when uploading of all transmission files ends, a positive determination result is obtained in step S250, and the image forming apparatus 12 ends the scan and upload process. The upload instruction may be operated during generation (step S240) of the scan data and creation (step S242) of the transmission file, for example. In this case, the flow may proceed to FIG. 5, and the process corresponding to FIG. 5 may be executed.

On the other hand, when a preset period of time has elapsed with no operation input, the image forming apparatus 12 is reset, and the screen of the browser of the monitor 46 is returned to the initial screen. In this way, a new user can use the image forming apparatus 12.

When the upload instruction is not input, a negative determination result is obtained in step S246, and the image forming apparatus 12 proceeds to step S252. In step S252, it is checked whether a preset period of time which is set to reset the apparatus when the period expires has elapsed. Here, when the preset period of time has elapsed, a negative determination result is obtained in step S252, and the image forming apparatus 12 proceeds to step S254.

Moreover, when the transmission file is uploaded to the web server 14, and the data volume of the transmission file exceeds a data volume set on the web server 14, the uploading is not completed. Moreover, depending on the state of the web server 14, the uploading of the transmission file may be stopped. In this case, a negative determination result is obtained in step S250.

When a negative determination result is obtained in step S250, the image forming apparatus 12 proceeds to step S254. That is, when no upload instruction is input even after the elapse of the preset period, or when the uploading is not completed even when the upload instruction is input, the image forming apparatus 12 proceeds to step S254.

In step S254, the screen of the browser displayed on the monitor 46 is switched to the initial screen, and the upload process is moved to the background. In this case, the image forming apparatus 12 maintains the screen of the browser on which the upload instruction is awaited on the background. At the same time, the image forming apparatus 12 maintains the user information of the user who has instructed the scan and upload process (step S256). In this way, a new user can log into the image forming apparatus 12.

When the browser is returned to the initial screen, the flow proceeds to step S258, and the image forming apparatus 12 checks whether there is a login request. When there is a login request from a user, the image forming apparatus 12 performs user authentication to allow the logging-in of the authenticated user.

When there is a login request from the user, and the requesting user is authenticated, a positive determination result is obtained in step S258, and the image forming apparatus 12 proceeds to step S260. In step S260, the user information of the authenticated user is compared with the user information (the user information which has been maintained on the background) of the user who has instructed the scan and upload process. In this way, when the logged-in user is identical to the user who has instructed the scan and upload process, a positive determination result is obtained in step S262, and the flow proceeds to step S264.

In step S264, the screen of the browser maintained on the background is displayed on the monitor 46. That is, the image forming apparatus 12 returns the stopped scan and upload process from the background to the foreground.

In this way, the user can perform a second upload instruction with respect to the stopped scan and upload process. Moreover, the user can stop the scan and upload process and delete the scan data (the transmission file).

In the scan and upload process of FIGS. 5 and 11, a case where the uploading of the transmission file is not completed may be considered. In this case, the scan and upload process may be maintained on the background, and the user who has instructed the scan and upload process may return the scan and upload process to the foreground to perform a new processing instruction with respect to the scan and upload process.

In FIG. 14, when a negative determination result is obtained in step S262, the logged-in user can perform a process other than the scan and upload process maintained on the background using the image forming apparatus 12.

Moreover, a case where a user other than the user who has instructed the scan and upload process accesses the scan and upload process which has been moved to the background may be considered. In this case (for example, when a negative determination result is obtained in step S262 of FIG. 14), the scan data (the transmission file) which has been stored for the maintained scan and upload process may be deleted.

As above, in the image forming apparatus 12 according to this exemplary embodiment, when the upload button 76 is operated on the HTML form provided from the web server 14, transmission of data is not started, and the upload instruction is maintained. Moreover, after creation of the transmission file is completed, the image forming apparatus 12 executes the upload instruction which has been maintained. In this way, even when there are a number of documents, and a long period of time is required for creating the transmission file, the user can input the upload instruction in advance without waiting until the creation of the transmission file is completed.

Moreover, in the image forming apparatus 12, by inputting the upload instruction in advance, the user does not need to wait until the creation of the transmission file is completed, and the uploading is possible.

Moreover, in the image forming apparatus 12, by executing the scan and upload process on the background, processes which use other functions can be performed on the foreground. In this case, since the authentication information of the user of the scan and upload process executed on the background is maintained separately, another user can use the image forming apparatus 12 on the foreground.

The exemplary embodiment described hereinabove does not limit the configuration of the invention. The invention may be embodied in a form such that respective portions include their aimed-for functions. Moreover, all patent applications disclosed in this specification and technical documents disclosed in the patent applications are incorporated in this specification by reference to the same extent as when individual documents, patent applications, and technical standards are incorporated by reference and are written in detail and individually.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
a display control unit that displays any one of a plurality of processing screen data including screen data provided by a server device on a display unit and executes an instructed process according to a display screen data;
a receiving unit that receives, on the screen data provided by the server device, displayed on the display unit, a read instruction of causing an image reading unit to read a document image and a transmission instruction for storing image data corresponding to the read document image in the server device;
an instruction maintaining unit that maintains the transmission instruction received by the receiving unit; and
a reading and transmission executing unit that executes reading of the document image based on the read instruction and executes the transmission instruction maintained in the instruction maintaining unit with respect to the image data obtained by the reading after the reading is completed,
wherein the display control unit includes a switching unit that switches the processing screen data displayed on the display unit during execution of a process of the reading and transmission executing unit so that the process of the reading and transmission executing unit is executed in a non-display state,
the image processing device further comprising:
an authentication unit that authenticates a user who inputs a processing instruction corresponding to an image displayed on the display unit; and
an authentication information maintaining unit that maintains user authentication information and links the user authentication information to the processing instruction when the process of the reading and transmission executing unit is being executed in a non-display state,
wherein the switching unit compares newly authenticated authentication information with the authentication information maintained in the authentication information maintaining unit when the process of the reading and transmission executing unit is being executed in a non-display state, and switches the process displayed on the display unit based on the comparison result.

2. The image processing device according to claim 1, further comprising:
a processing state screen data generation unit that generates a screen data indicating a progress state of the process of the reading and transmission executing unit, wherein
the display control unit displays a screen data indicating the progress state when the process of the reading and transmission executing unit is displayed on the display unit.

3. The image processing device according to claim 2, further comprising:
a connection unit to which an image processing terminal that includes a display unit that displays an image is connected; and
a transmitting unit that transmits a screen data indicating the progress state to the image processing terminal based on a request from the image processing terminal connected to the connection unit when the process of the reading and transmission executing unit is executed in the non-display state.

4. The image processing device according to claim 1, further comprising:
a transmission information maintaining unit that maintains information including the read data and the transmission instruction when the transmission of the read data read by the reading and transmission executing unit to the server device is not completed.

5. An image forming apparatus comprising:
the image processing device according to claim 1; and
an image forming unit that forms an image, on a recording medium, based on the image data of the document image read by the image reading unit or image data input via an input unit.

6. A non-transitory computer readable medium storing an image processing program for causing a computer to function as:
a display control unit that displays any one of a plurality of processing screen data including screen data provided by a server device on a display unit and executes an instructed process according to a display screen data;
a receiving unit that receives, on the screen data provided by the server device, displayed on the display unit, a read instruction of causing an image reading unit to read a document image and a transmission instruction for storing image data corresponding to the read document image in the server device;
an instruction maintaining unit that maintains the transmission instruction received by the receiving unit; and
a reading and transmission executing unit that executes reading of the document image based on the read instruction and executes the transmission instruction maintained in the instruction maintaining unit with respect to the image data obtained by the reading after the reading is completed,
wherein the display control unit includes a switching unit that switches the processing screen data displayed on the display unit during execution of a process of the reading and transmission executing unit so that the process of the reading and transmission executing unit is executed in a non-display state,
the computer being caused to further function as:
an authentication unit that authenticates a user who inputs a processing instruction corresponding to an image displayed on the display unit; and
an authentication information maintaining unit that maintains user authentication information and links the user authentication information to the processing instruction when the process of the reading and transmission executing unit is being executed in a non-display state,
wherein the switching unit compares newly authenticated authentication information with the authentication information maintained in the authentication information maintaining unit when the process of the reading and transmission executing unit is being executed in a non-display state, and switches the process displayed on the display unit based on the comparison result.

7. An image processing method comprising:
displaying any one of a plurality of processing screen data including screen data provided by a server device on a display unit and executing an instructed process according to a display screen data;
receiving, on the screen data provided by the server device, displayed on the display unit, a read instruction of causing an image reading unit to read a document image and a transmission instruction for storing image data corresponding to the read document image in the server device;
maintaining the received transmission instruction; and
executing reading of the document image based on the read instruction and executing the maintained transmission instruction with respect to the image data obtained by the reading after the reading is completed,
wherein the displaying further includes switching the processing screen data displayed on the display unit during a process of executing reading or executing the maintained transmission instruction so that the process of executing reading or executing the maintained transmission instruction is executed in a non-display state,
the method further comprising:
authenticating a user who inputs a processing instruction corresponding to an image displayed on the display unit; and
maintaining user authentication information and linking the user authentication information to the processing instruction when the process of executing reading or executing the maintained transmission instruction is executed in a non-display state,
wherein the switching includes comparing newly authenticated authentication information with the maintained authentication information when the process of executing reading or executing the maintained transmission instruction is executed in a non-display state, and switching the process displayed on the display unit based on the comparison result.

8. An image processing device comprising:
a scanner;
a touch panel including a display unit that displays a screen data transmitted from a server that receives an upload instruction for uploading an image data to the server and that receives the upload instruction while the screen data is displayed;
an instruction maintaining unit that causes the scanner to read a document to generate an image data and that maintains the upload instruction; and
a transmission unit that executes the upload instruction held in the instruction maintaining unit and that transmits the image data to the server, after the generation of the image data is completed,
wherein the touch panel includes a switching unit that switches processing screen data displayed on the display unit during execution of a process of a reading and transmission executing unit so that the process of the reading and transmission executing unit is executed in a non-display state, the image processing device further comprising:

an authentication unit that authenticates a user who inputs a processing instruction corresponding to an image displayed on the display unit; and an authentication information maintaining unit that maintains user authentication information and links the user authentication information to the processing instruction when the process of the reading and transmission executing unit is being executed in a non-display state, wherein the switching unit compares newly authenticated authentication information with the authentication information maintained in the authentication information maintaining unit when the process of the reading and transmission executing unit is being executed in a non-display state, and switches the process displayed on the display unit based on the comparison result.

* * * * *